US008608541B2

(12) United States Patent
Seelig et al.

(10) Patent No.: US 8,608,541 B2
(45) Date of Patent: Dec. 17, 2013

(54) GAMING DEVICE AND METHOD OF USE

(75) Inventors: Jerald C. Seelig, Absecon, NJ (US); Lawrence M. Henshaw, Hammonton, NJ (US)

(73) Assignee: IGT, Las Vegas, NV (US)

( * ) Notice: Subject to any disclaimer, the term of this patent is extended or adjusted under 35 U.S.C. 154(b) by 908 days.

(21) Appl. No.: 12/052,141

(22) Filed: Mar. 20, 2008

(65) Prior Publication Data

US 2008/0167109 A1 Jul. 10, 2008

Related U.S. Application Data

(63) Continuation-in-part of application No. 11/126,084, filed on May 9, 2005, now abandoned, and a continuation-in-part of application No. 12/042,828, filed on Mar. 31, 2008, now Pat. No. 7,727,065, and a continuation-in-part of application No. 10/883,489, filed on Jun. 30, 2004, now Pat. No. 7,258,610, and a continuation-in-part of application No. 10/245,532, filed on Sep. 16, 2002, now Pat. No. 6,860,809, and a continuation-in-part of application No. 09/644,279, filed on Aug. 22, 2000, now Pat. No. 6,450,884, and a continuation-in-part of application No. 09/535,075, filed on Mar. 23, 2000, now Pat. No. 6,338,678.

(60) Provisional application No. 60/986,210, filed on Nov. 7, 2007.

(51) Int. Cl.
*G06F 17/00* (2006.01)

(52) U.S. Cl.
USPC .................................. 463/17; 463/16; 463/20

(58) Field of Classification Search
USPC ..................................................... 463/16–20
See application file for complete search history.

(56) References Cited

U.S. PATENT DOCUMENTS

| | | | | |
|---|---|---|---|---|
| 4,448,419 | A | 5/1984 | Telnaes | |
| 4,871,171 | A | 10/1989 | Rivero | |
| 5,380,007 | A | 1/1995 | Travis et al. | |
| 5,456,465 | A | 10/1995 | Durham | |
| 5,785,594 | A * | 7/1998 | Seibert et al. | 463/17 |
| 5,848,932 | A | 12/1998 | Adams | |
| 6,338,678 | B1 * | 1/2002 | Seelig et al. | 463/17 |
| 2002/0039923 | A1 * | 4/2002 | Cannon et al. | 463/42 |
| 2002/0166882 | A1 * | 11/2002 | Roberts et al. | 225/2 |
| 2005/0086313 | A1 * | 4/2005 | Lucas et al. | 709/206 |

* cited by examiner

*Primary Examiner* — Michael Cuff
(74) *Attorney, Agent, or Firm* — Foley & Lardner LLP

(57) ABSTRACT

A gaming device including a game apparatus configured to allow a player to play a game including moveable prize objects is disclosed. The gaming device may also include a prize object holder configured to hold the prize objects where the prize objects are allowed to move within the prize object holder. A controller may be in communication with the game apparatus. The controller may be configured to determine a game outcome and to move the prize object holder to display the game outcome to the player. In another embodiment, a dynamic prize object which is distinguishable from all other prize objects may be included among the moveable prize objects where the dynamic prize object may be used to convey special prizes to the player.

24 Claims, 15 Drawing Sheets

GAMING DEVICE AND METHOD OF USE

CROSS REFERENCES TO RELATED APPLICATIONS

This application is a continuation-in-part application of U.S. patent application Ser. No. 11/126,084, filed May 9, 2005. The current application is also a continuation-in-part application of U.S. patent application Ser. No. 12/042,828, filed Mar. 5, 2008; which is a continuation-in-part application of U.S. patent application Ser. No. 11/851,164, filed Aug. 20, 2007; which is a continuation-in-part application of U.S. patent application Ser. No. 10/883,489, filed Jun. 30, 2004, since issued as U.S. Pat. No. 7,258,610 on Aug. 21, 2007; which is a continuation-in-part application of U.S. patent application Ser. No. 10/245,532, filed Sep. 16, 2002, since issued as U.S. Pat. No. 6,860,809 on Mar. 1, 2005; which is a continuation-in-part application of U.S. patent application Ser. No. 09/644,279, filed on Aug. 22, 2000, since issued as U.S. Pat. No. 6,450,884 on Sep. 17, 2002; which is a continuation-in-part application of U.S. patent application Ser. No. 09/535,075, filed on Mar. 23, 2000, since issued as U.S. Pat. No. 6,338,678 on Jan. 15, 2002. The current application also claims priority of U.S. provisional patent application No. 60/986,210, filed Nov. 7, 2007. All of the above referenced applications are hereby expressly incorporated by reference in their entireties.

BACKGROUND OF THE INVENTION

The present invention relates to gaming devices, and methods of use. More specifically, the gaming device includes prize objects and a prize object holder that can be moved to display a game outcome.

Gaming Devices

Gaming devices are well known in the art and a large variety of gaming devices have been developed. In general, gaming devices allow users or players to play a game. In many casino-type gaming devices, the outcome of the game depends, at least in part, on a randomly generated event. For example, a gaming device may use a random number generator to generate a random or pseudo-random number. The random number may then be compared to a predefined table to determine the outcome of the event. If the random number falls within a certain range of numbers on the table, the player may win a predefined prize. The table may also contain display information that allows the gaming device to generate a display that corresponds to the outcome of the game. The gaming device may present the outcome of the game on a large variety of display devices, such as mechanical spinning reels or video screens.

Bonus Prizes

Some gaming devices award bonuses in addition to prizes that are awarded in the primary game. A bonus can be defined as an additional prize that is awarded to the player when a predefined event occurs. An example of a bonus game can be found in U.S. Pat. No. 5,848,932 issued to Adams. One of the gaming devices described in this document comprises three spinning reels and a spinning wheel bonus display. When predetermined indicia are displayed on the spinning reels of the primary game, the wheel can be activated to indicate a bonus prize. The bonus prize is awarded in addition to any prizes awarded in the primary game.

In another embodiment described in this document, the gaming device includes a container having one or more movable objects and a transport device for transporting the one or more movable objects within the container. When predetermined symbols are displayed on the reels of the primary game, the transport device can be activated to transport the movable objects while the player is allowed to play the bonus game.

Generally, bonus prizes are offered in such games in order to increase the excitement and enjoyment experienced by players. This attracts more players to the game and encourages players to play longer. When gaming devices attract more players and the players play longer, they tend to be more commercially successful relative to other gaming devices.

Display Devices

In addition, highly visible display devices are utilized on gaming devices in order to attract players. Once players are attracted to the gaming device, they tend to play longer because the display device enhances the stimulation and excitement experienced by players. It is, therefore, desirable for gaming devices to incorporate highly visible display devices.

The applicants believe that display devices tend to be more successful if they are a derivation of a well-known game or theme. They are more successful because players tend to be drawn to games that they instantly recognize. Many players are reluctant to try completely new games because they must spend time to learn the new game. It is, therefore, desirable to provide display devices that are based on well-known games or themes.

The applicants also believe that display devices tend to be more successful if they utilize physical objects rather than simulations. Although video devices and electronic signs can be used for display devices, players are more attracted to display devices that utilize physical objects. Physical objects can be even more effective display devices if they are moveable and they are used in combination with lights and sounds. With the movement of objects within display devices, it is advantageous to use transport devices that will attain maximum effectiveness while occupying a minimum amount of space. It is important to minimize the amount of occupied space because a smaller gaming device generally corresponds to an overall lower cost.

Keno

Upon an initial examination, it would appear that the display device of Keno is an excellent choice for a display device for gaming devices. Keno is well known to the playing public, and it utilizes a highly visible and attractive display device. The display device comprises a container with a plurality of numbered balls. The balls in the container are agitated or jumbled, usually by a jet of air, to a state where they ricochet off of the walls of the container.

In the game of Keno, players select numbers that may be drawn from the Keno display device. The display device jumbles or mixes numbered balls in the container and then draws a predetermined number of balls from the container. Players are paid based on the number of balls drawn from the display device that match the numbers they selected.

The Keno display device has been unsuitable for use with gaming devices. One of the reasons this is so is because Keno is susceptible to environmental influences. An important aspect of any gaming device is resistance to environmental influences that could affect the results of the game. However, as the balls are jumbled in the Keno ball device, static electricity, dust, and contaminants build up on the balls. This may cause the balls to stick to each other or to components in the display device thereby influencing the randomness of the game. Furthermore, the balls used in Keno displays may have slightly different weights or sizes that subtly affect the outcome of the game.

Another reason the game of Keno has been unsuitable as a display for a gaming device is that it requires a great deal of human involvement. In many Keno games, human operators are required to read the numbers of the Keno balls as they are selected and input the numbers into a computer or display. Furthermore, operators must regularly clean the Keno balls and the Keno devices to keep dust and contaminants from building up on the balls. Not only does this require far too much human involvement for an automated gaming device (the greater the human involvement, the greater the cost of operating the game), the game is also susceptible to tampering and cheating.

Because of their susceptibility to environmental influences and tampering and their dependence on human operators and maintenance personnel, Keno games are not allowed in at least one major gaming jurisdiction. Furthermore, these disadvantages have prevented Keno display devices and other devices that use jumbled balls from being adapted for use with gaming devices.

Jumbled Ball Displays

Two references that have attempted to utilize jumbled ball displays are U.S. Pat. No. 4,871,171 issued to Rivero and U.S. Pat. No. 5,380,007 issued to Travis et al. Rivero appears to disclose a game device with means for simulating the release of a ball. In this reference, a rotating drum 2 is provided with numbered balls 17. As the drum rotates, a ball is released into a transparent tube 16.

However, Rivero is not intended to show the player the ball that is released from the drum. Rather, the ball is held in the tube, out of view of the player, and an electronic simulation of the ball number is presented in a window 9. This is intended to give the player "the impression" that the ball has been counted. Rivero fails to disclose or suggest displaying actual balls to the player to indicate the outcome of the game or the value of a prize. In addition, in the Rivero device the balls are in a cage and quite exposed to the environment and tampering. The ball cage of Rivero is also mounted on the front side and well below the top of the gaming machine, hiding the ball cage from view of potential game players who are not in position to see the front side of the machine.

Travis et al. appears to disclose a video lottery gaming device with numbered balls 48. However, all of the balls are simulations generated by software and no physical balls are displayed to the player. Travis et al. also fails to disclose or suggest displaying actual balls to the player to indicate the outcome of the game or the value of a prize.

One of the disadvantages with Rivero and Travis et al. is that no actual physical balls are used to display the outcome of a game. This is less desirable because players like to see physical objects rather than electronic simulations of the physical objects. Moreover, players tend to believe that a game device is misleading when the device purports to display a simulation of an object rather than the object itself. This is especially true when the object itself is supposedly available for viewing, as is the case in Rivero.

Mechanical Reels

Mechanical Reels are well known to use in the art as a display device. A large variety of mechanical reel displays have been developed. In general, the mechanical reels display several types of indicia. When several of the indicia are matched on a pay line, a game winning outcome is indicated. Reel-type gaining devices have been used in gaming for more than one hundred years. Traditional reel-type gaming devices have three mechanical reels that rotate around a common horizontal axis. A reel strip is attached around the circumference of each reel and the reel strips display a plurality of indicia. During normal operation, the reels are spun and stopped to display an outcome of the game. As each reel comes to a stop, a symbol on the perimeter of each reel strip is displayed on the front of the gaming device. Some gaming devices indicate a winning outcome by aligning pre-determined symbols on one or more pre-determined pay lines. Gaming devices of the spinning reel type have been provided with a variety of different graphics, shapes, sound effects, and scoring systems. Some gaming devices have multiple pay lines such as additional horizontal pay lines, diagonal pay lines, and even V-shaped pay lines. The number of reels has increased beyond the basic three reel gaming devices. There are now slot machines with four reels, five reels, and even ten reels.

One problem with mechanical reels is that in general they all look the same. Typically, the only difference between mechanical reels from one gaming machine to another is the look of the indicia that are mounted on the perimeter of the reels. This similarity between gaming machines can lead to these machines being ignored by game players and to player boredom, resulting in less revenue to the casino operator. What is needed is a display device that is a derivation of a well-known game or theme and that utilizes physical objects in an attractive and entertaining manner.

BRIEF SUMMARY OF THE INVENTION

In certain embodiments, the present invention relates to a gaming device that includes a housing with several moveable prize objects. The prize objects are configured to communicate a game outcome. At least one moveable prize object holder is mounted in the housing. The prize object holder has several chambers. Each chamber is configured to non-rigidly and contains at least one of the plurality of prize objects. The chambers allow the prize objects to move within the chambers and each chamber has a viewable portion. A player may see the prize object within the chamber. The housing and the prize object holder are configured to allow a player to view the chambers and more than one prize object at a time within the chambers.

In other embodiments, the present invention relates to a gaming method. According to the method, a player is allowed to place a wager and play a game of chance. A game outcome is determined, which may include a prize qualifying event. If the game outcome comprises the prize qualifying event, a display is activated that has several prize objects that are contained in several prize object holders. The prize object holder has several chambers that non-rigidly contain the prize objects. The prize objects are viewable within the chamber. A subset of the prize objects is simultaneously viewable by the player. The prize object holder is moved and stopped. The stopped prize objects convey the second game outcome. Any prizes can be awarded to the player.

In another embodiment, the present invention involves a gaming system comprising (A) a plurality of game apparatus, each game apparatus configured to play a game of chance wherein each game apparatus comprises a housing; a plurality of moveable prize objects, the moveable prize objects being configured to communicate random game outcomes; at least one moveable prize object holder configured to hold the plurality of moveable prize objects, wherein at least one of the moveable prize objects is a dynamic prize object, the dynamic prize object being distinguishable from all other moveable prize objects; and at least one controller configured to determine a first random game outcome, select at least one moveable prize object from the plurality of moveable prize objects associated with the first random game outcome; and cause the selected moveable prize object to be displayed to the player;

and (B) a central controller in communication with the plurality of game apparatus and the at least one controller of each of the plurality of game apparatus wherein when the selected moveable prize object from above is the dynamic prize object, the central controller is configured to determine a second random game outcome associated with selection of the dynamic prize object, assign a prize value associated with the selected dynamic prize object, and cause the game apparatus associated with the selected dynamic prize object to display the prize value to communicate the second random game outcome to the player.

For purposes of the present invention, "determining (or determination of) a random game outcome" shall mean actively causing, deciding, dictating, choosing, selecting or affecting the random outcome of the game. This is in contrast to detecting, learning, identifying, discovering, ascertaining or finding out the result of the game outcome.

For the purposes of the present invention, "central controller" may include a central processor, computer, processor system, computer system or similar device, from which control of all game outcomes (and related communications thereof) may be provided. The central controller would determine values associating various display symbols or indicia with a possible prize, such as a free play, eligibility for a bonus, and related awards available to the player. In addition, for example, a central controller would provide access to data files, programs and peripheral devices, such as components of a game apparatus network. A central controller could also provide storage functions for multiple game apparatus without requiring multiple subfunctions (such as random number generators) to be provided for each individual game apparatus, thus economizing on computer disk space and providing for administering and updating programs more efficiently.

Among the advantages of the present invention are those directed to (1) the ability to provide game players with a more exciting and desirable gaming experience; (2) the ability to attract more patrons to play a game; (3) provide longer play times and a greater payout possibility for a player; (4) provide greater revenues for gaming operators; (5) provide a gaming device that utilizes a visually appealing and highly visible display device; (6) provide a gaming device that may allow a player to at least have the illusion of being able to affect a game outcome; (7) provide a gaming device that may convey a game outcome by using a moveable prize object holder; (8) provide a gaming device that may convey a game outcome by using a display holder; (9) provide a gaming device that may use a variety of prize objects; and (10) provide a variety of ways to indicate a game outcome.

These and other advantages may be realized by reference to the remaining portions of the specification, claims, and abstract.

The above description sets forth, rather broadly, a summary of one embodiment of the present invention so that the detailed description that follows may be better understood and contributions of the present invention to the art may be better appreciated. Some of the embodiments of the present invention may not include all of the features or characteristics listed in the above summary. There are, of course, additional features of the invention that will be described below and will form the subject matter of claims. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

DETAILED DESCRIPTION OF THE INVENTION

In the following detailed description of the preferred embodiments, reference is made to the accompanying drawings, which form a part of this application. The drawings show, by way of illustration, specific embodiments in which the invention may be practiced. It is to be understood that other embodiments may be utilized and structural changes may be made with out departing from the scope of the present invention.

In the Detailed Description below, the applicants utilize various spatially orienting terms such as "upper," "lower," "horizontal," and "vertical." It is to be understood that these terms are used for ease of description of the preferred embodiments with respect to the drawings but are not necessarily in themselves limiting or requiring of an orientation as thereby described in the following Detailed Description.

Game Apparatus

Figure 1:
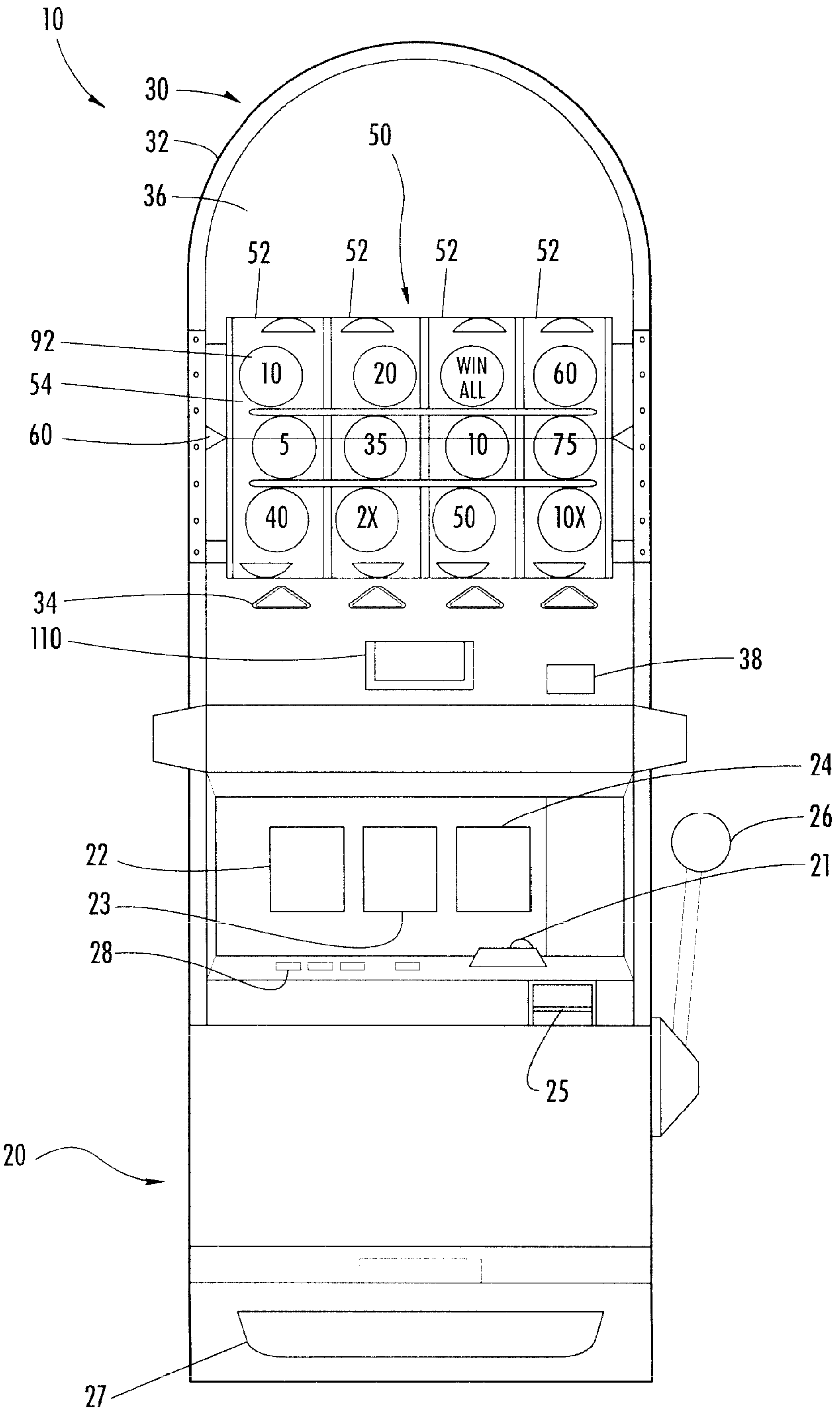
FIG. 1 is substantially a front view of a gaming device of the present invention.

Referring to FIG. 1, one embodiment disclosed herein comprises a gaming device, generally indicated by reference number 10. Gaming device 10 comprises a primary game apparatus 20 and a bonus game apparatus 30. Bonus game 30 may comprise a display device 50. Game apparatus 20 may be any of a large number of devices that are adapted to allow players to play a game. For example, game apparatus 20 may utilize reel displays, such as spinning reels 22-24 or a video display (not shown), to display outcomes of the game. Means may also be provided for accepting wagers, such as a coin slot 21 or card reader 25, and for awarding prizes, such as a coin dispenser 27. A handle 26 and button 28 are provided for activating game apparatus 20 to begin a game. In at least one preferred embodiment, game apparatus 20 may be an S Plus model gaming device manufactured by International Game Technology in Reno, Nev.

Game apparatus 20 is preferably controlled by an electronic controller 82 (see FIG. 2) that utilizes a random number generator. The random number generator produces a random or pseudo random number for each game. The outcome of the game may be determined by comparing the random number to a table of outcomes stored in a memory and accessed by controller 82. A number of different tables of outcomes may be used and different tables may be used for different games. The tables can be designed so that different prizes have different probabilities of being awarded. Such design techniques are well known in gaming. Examples of such designs are shown in U.S. Pat. No. 4,448,419, issued to Telnaes, and U.S. Pat. No. 5,456,465, issued to Durham. Controller 82 (FIG. 2) causes spinning reels 22-24 of the video display to show the outcome of the game that corresponds to the outcome of the random number generator. It is recognized that game apparatus 20 may operate in many other ways and still achieve the objects of the present invention.

Game apparatus 20 may also be capable of producing a bonus-activating event. This event may be many different types of events. For example, a bonus-activating event may comprise displaying a particular symbol, such as a "bonus" symbol, or combination of symbols, such as three "7" symbols, on reels 22-24. If the game being played is poker based, the bonus-activating event may be occurrence of a certain hand, such as a royal flush. Furthermore, a bonus-activating event may occur when a player accumulates a number of symbols or game outcomes over a number of separate game plays. For example, a bonus-activating event may occur when the player receives three "bonus" symbols during a period of time. The bonus-activating event may be based on an external event. For example, a bonus-activating event may occur when a group of players obtain a certain result.

Bonus Game

Figure 2:
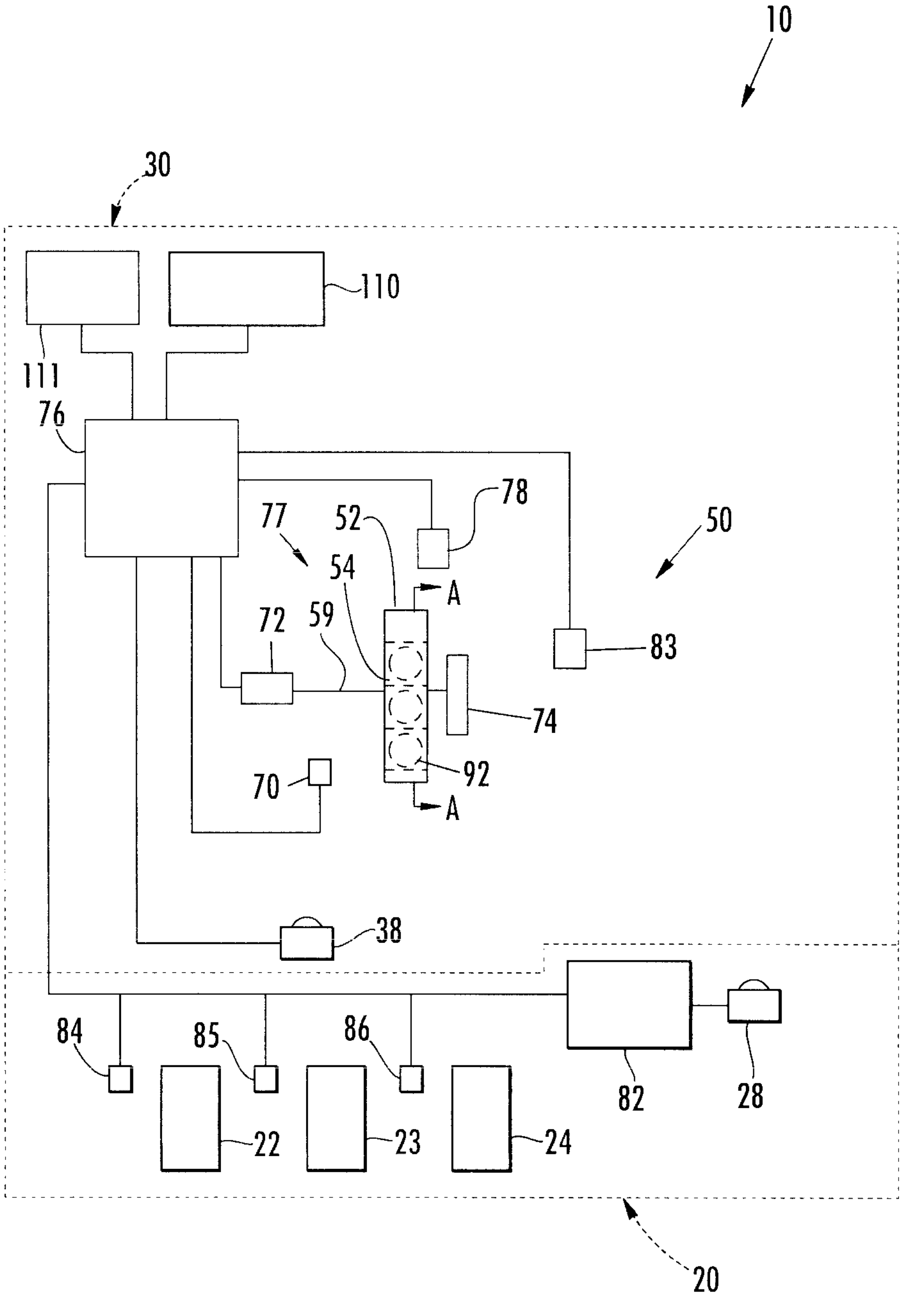
FIG. 2 is substantially a schematic diagram of a portion of the gaming device of FIG. 1.
Figure 3:
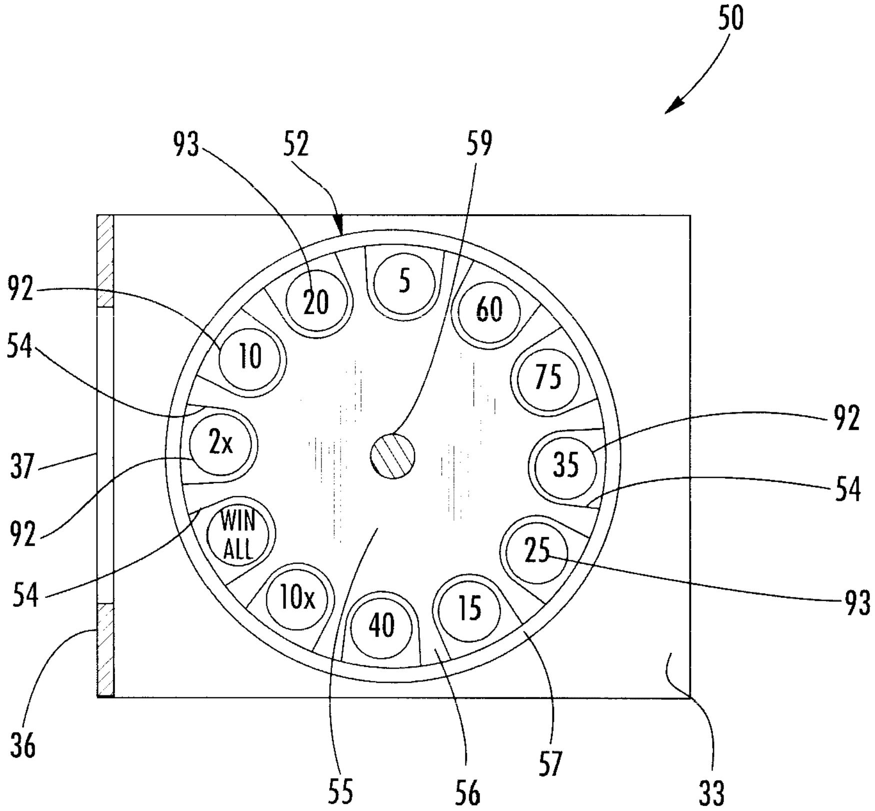
FIG. 3 is substantially a side cross sectional view of the preferred prize object holder of the present invention taken along line A-A in FIG. 2.

Referring to FIGS. 1 and 3, bonus game apparatus 30 has a housing 32 with an interior cavity 33. Housing 32 can be made from many different materials such as metal or plastic and can include decorative coverings or attachments and lights. Several player input devices 34 and 38 can be mounted in housing 34. Player input devices 34 can be buttons or handles or rotary knobs. Player input device 34 and 38 can allow a game player to control some aspect of bonus game apparatus 30. A display 110 (FIG. 2) can be used to display prizes won on bonus game apparatus 30. Housing 32 can have a front surface 36 with a transparent window 37 located therein.

Display device 50 comprises several prize object holders 52 that are adapted to hold a plurality of prize objects 92. FIG. 1 shows four prize object holders 52 mounted side by side. While four prize object holders 52 are shown, more or less prize object holders may be used in display device 50. Prize object holders 52 are shown rotating about a horizontal axis in FIG. 1. Prize object holders 52 can also rotate about a vertical axis. Prize object holder 52 is at least partially transparent allowing players to view prize objects 92 inside prize object holder 52. Prize object holder 52 can be made of a transparent material, such as plastic or glass. Display device 50 can have one or more paylines 60.

As seen in FIG. 3, display device 50 comprises a cylindrical prize object holder 52 that may be rotated around its central axis 59. Axis 59 can be a metal shaft. Prize object holder 52 comprises a disc 55 with a plurality of chambers 54 positioned along the periphery of the holder, each chamber is adapted to hold one or more prize objects 92. Chambers 54 can hold several prize objects 92. In the example shown, only one prize object 92 is located in each chamber. Disc 55 can be fabricated from a variety of materials such as metal, plastic or wood. Walls 56 separate adjacent chambers 54. An outer surface 57 surrounds disc 55 and encloses chambers 54. Preferably, a least a portion of the outer surface 57 adjacent to each chamber 54 comprises a transparent material that allows players to view prize object 92 inside the chamber. The transparent surface may comprise a ring of transparent material that surrounds disc 55.

It is noted that prize objects 92 can be allowed to move within chambers 54. The rotation of prize object holder 52 can cause prize objects 92 to bounce and ricochet within chamber 54. The motion of balls with chamber 54 can make a noise. The motion and noise of prize objects 92 moving within chambers 54 can attract and entertain game players. When prize object holder 54 is rotated, it produces a vivid display that attracts the attention of people nearby and provides an exciting display for players playing gaming device 20.

It is noted that the game player can view the contents of several of the chambers 54 at the same time (FIG. 1). The game player can simultaneously view a set or subset of the prize objects 92.

Additional devices can be added to chambers 54 in order to assist with the mechanical motion of prize objects 92 within chambers 54. For example, air jets (not shown) could be routed into chambers 54 and pressurized air blown into chambers 54 in order to cause rapid motion of prize objects 92. The air jets would be attached to a source or pressurized air such as an air pump or fan. Other devices such as a mechanical agitator or vacuum source could also be added to chambers 54 in order to assist with the mechanical motion of prize objects 92.

Prize objects 92 can have a prize symbol or indicia 93 mounted thereon. Prize symbol 93 can indicate the game outcome of bonus game apparatus 30. Prize symbol 93 can be a variety of indicia. For example, prize symbol 93 can indicate a winning amount such as 10 or 20 credits or prize symbol 93 can indicate a multiplier amount such as 2×. The multiplier would multiply any winnings in the primary game and return the total winnings to the game player. Prize symbols 93 can also indicate the winning of physical prizes such as a vacation or a car.

In FIG. 3, prize objects 92 are shown as a ball. It is contemplated that prize objects 92 can be many other shapes and configurations. For example, prize objects 92 may have a shape such as a cube, cylinder, triangle, etc. Further, prize objects 92 may be shaped to resemble animated objects such as animals or cartoon characters. Prize object 92 may also be shaped to resemble physical prizes or goods, such as a car, boat or snowmobile.

Although prize objects 92 are preferably similar to Keno balls, many other types of balls may be used. For example, the balls may be ping-pong balls or rubber balls.

Turning now to FIG. 2, bonus game apparatus 30 comprises a controller 76 that is adapted to control the operation of the game apparatus. Controller 76 may be one or more computers or processor boards. For example, in the presently implemented embodiment, controller 76 comprises a bonus controller and stepper motor controller, which may be manufactured by Progressive Solutions in Carmichael, Calif., a core module by Z-World in Davis, Calif., and a sound board by Cleverdevices in Syosset, N.Y. Other, equally suitable devices may be purchased from other manufacturers. It is recognized that controller 76 may be a single processor or processor board. Furthermore, it is also recognized that controller 76 and controller 82 may be combined in a single processor or processor board.

Controller 76 is adapted to detect when a bonus activating event occurs in game apparatus 20. This may be accomplished by game apparatus controller 82 transmitting a signal to controller 76 that a bonus event has occurred. For example, controller 82 may determine the outcome of each game and when a bonus-activating outcome occurs, it transmits a signal to controller 76. Alternatively, controller 76 may periodically interrogate controller 82. In another embodiment, one or more sensors may be provided for determining if a bonus activating event has occurred. For example, sensors 84-86 may sense the positions of reels 22-24. When reels 22-24 are in a bonus activating position, controller 76 would sense this position and begin a bonus sequence (described below). Sensors may also be provided external to gaming device 10 to detect external bonus-activating events.

Controller 82 may also transmit a variety of information to controller 76. For example, controller 82 may signal when coins or currency have been inserted, when a game starts, when an error has occurred, and when a sensor detects tampering.

When controller 76 detects a bonus-activating event, it may begin a bonus sequence by activating display 110. Display 110 may comprise many different kinds of display devices, such as video screens, lights, light emitting diodes, etc. Display 110 may comprise its own controller that is adapted to generate a variety of displays.

Display 110 may indicate that a player has qualified for a bonus round and prompt the player to perform an action. In the preferred embodiment, the player is prompted to activate the bonus sequence by pressing input device 38. Input device 38 may be a simple button, a keyboard, or a touch screen display. In the embodiment in which the player must accumulate a number of bonus symbols to qualify for a bonus, display 110 may indicate the number of symbols the player has received.

When controller 76 detects input device 38 being activated, the controller would activate stepper motor or actuator 72 causing prize object holders 52 to begin to rotate or spin. Stepper motor 72 is connected to prize object holders 52 by axis or shaft 59. Alternatively, the prize object holders may begin to rotate automatically after the detection of a bonus qualifying event. In another embodiment, controller 76 may wait a predetermined time period for the player to activate input device 38. If the player does not activate input device 38 in that time period, controller 76 would automatically activate display device 50 and initiate the display sequence.

Controller 76 performs a routine to determine which prize objects 92 will be displayed. This may be performed by a number of methods that are well known in the art. For example, prize objects 92 may be sequentially displayed or displayed based on external events, such as certain bonus activating events may always cause the same prize ball to be displayed.

In the preferred embodiment, however, prize objects 92 are randomly selected. Controller 76 generates a random number and then compares the random number to a pay table similar to that described for game apparatus 20 or as described in U.S. Pat. No. 5,823,874, issued to Adams. A simple pay table may appear as follows:

TABLE 1

| Random Number | Prize Ball Number | Amount Paid |
|---|---|---|
| 0.00 to 0.50 | 1 | $1.00 |
| 0.51 to 0.75 | 2 | $5.00 |
| 0.76 to 0.95 | 3 | ×2 |
| 0.96 to 1.00 | 4 | $1,000.00 |

For example, if the random number generator produced 0.65, prize object number 2 would be displayed and $5.00 would be awarded to the player. If the random number generator produced 0.80, prize object number 3 would be displayed. Prize object number 3 is a multiplier ball that multiplies some amount produced by game apparatus 20. Gaming apparatus 20, for instance, may award $20 and the multiplier prize object would multiply this by two, awarding the player $40.

This embodiment is not necessarily limited to the example pay table shown. A greater number of prize objects may be used and, as will be discussed below, a combination of prize objects may be displayed. Furthermore, different kinds of prizes, besides monetary prizes, may be awarded. For example, the prizes may be goods, services, or additional games. The goods and services may be awarded in the form of physical objects, tickets, vouchers, coupons, etc. Additional games may be presented in the form of tickets, such as scratch off lottery tickets. In the embodiments in which tickets, vouchers, and coupons are used, the objects are dispensed using an internally or externally mounted dispenser 111. Such dispensers are well known in the art.

Once controller 76 determines the prize object to be displayed and the prize to be awarded, the controller activates a positioning mechanism 77. Positioning mechanism 77 is adapted to position at least one selected prize object 92 so that it can be displayed. Positioning mechanism 77 may utilize a large variety of devices to achieve its purpose. In the preferred embodiment, all of the prize objects are held in prize object holder 52. Prize object holder 52 may be made from a variety of materials, such as plastics, metals, or composites. In one embodiment, holder 52 is cast high-density urethane foam that is machined to obtain a precise shape. In the preferred embodiment, holder 52 is injection molded plastic.

At least one of prize objects 92 have a symbol 93 that is capable of indicating a prize to be awarded to the player.

In the preferred embodiment, prize object holder 52 is cylindrical as illustrated in FIG. 3. Chambers 54 are positioned outward from a central axis 59 of prize object holder 52, near the periphery of the holder. Thus, chambers 54 may be positioned by rotating prize object holder 52 around its central axis 59.

Returning to FIG. 2, positioning mechanism 77 comprises a stepper motor 72 for rotating and stopping holder 52. Wheel 74, rigidly attached to holder 52, and sensor 83, not attached to the holder, are provided for determining the angular position of the holder. Thus, controller 76 can position a ball 92 in holder 52 where it can be viewed by a game player looking into window 37. The angular position of each prize object 92 is stored in memory in controller 76. Stepper motor 72 can stop prize object holder 52 at the location determined by the random number generator.

Sensor 83 may be an infrared source and detector and the periphery of wheel 74 may comprise portions with different reflective characteristics, such as physical holes or gaps or absorbent paint lines. Alternatively, an optical flag configuration similar to that described in U.S. Pat. No. 4,911,449, issued to Bertram, may be used.

Additional stepper motors (not shown) would be used to control the motion of the other prize object holders 52. Preferably, one stepper motor controls the motion of one prize object holder. Alternatively, all of the prize objects holders can be rotated by a single stepper motor and then a braking mechanism (not shown) can be used to selectively stop the rotation of individual prize object holders 52.

In normal operation, after controller 76 has determined which prize object 92 is to be displayed, the controller rotates holders 52 until the desired prize objects 92 are positioned in front of window 37 and aligned with payline 60 (see FIG. 1). At the appropriate time, controller 76 stops holders 52. This allows the game players to view prize objects 92 through window 37. Preferably, prize symbols 93 are displayed in several locations on prize objects 92 such that the symbols can be viewed from many different angles.

Sensors 70 may be used to verify that the prize objects are in the proper position. If sensor 70 does not detect prize object 92 in its proper position, controller 76 may enter an error mode.

Controller 76 may then cause display 110 to display the prize, if any, that the player has won. Other effects may also be presented, such as pre-recorded sound from speakers. If the actual prize is money, the amount of the prize may be added to the player's credit meter or the prize may be dispensed from dispenser 111 or coin dispenser 27.

Various lights 78 can be connected with controller 76 in order provide a decorative display. Lights 78 can be a direct light that shines into chambers 54 or can be back lighting that is located with in reel 55 and back lights chambers 54.

Combinations of prize objects 92 can be used to indicate various bonus outcomes. It is also possible to replace the primary display of a gaming device with display device 50. Game apparatus 20 may be entirely replaced by display device 50. In other words bonus gaming apparatus 30 can be used as a primary or base game apparatus.

Alternative Prize Object Holder Embodiment

Figure 4:
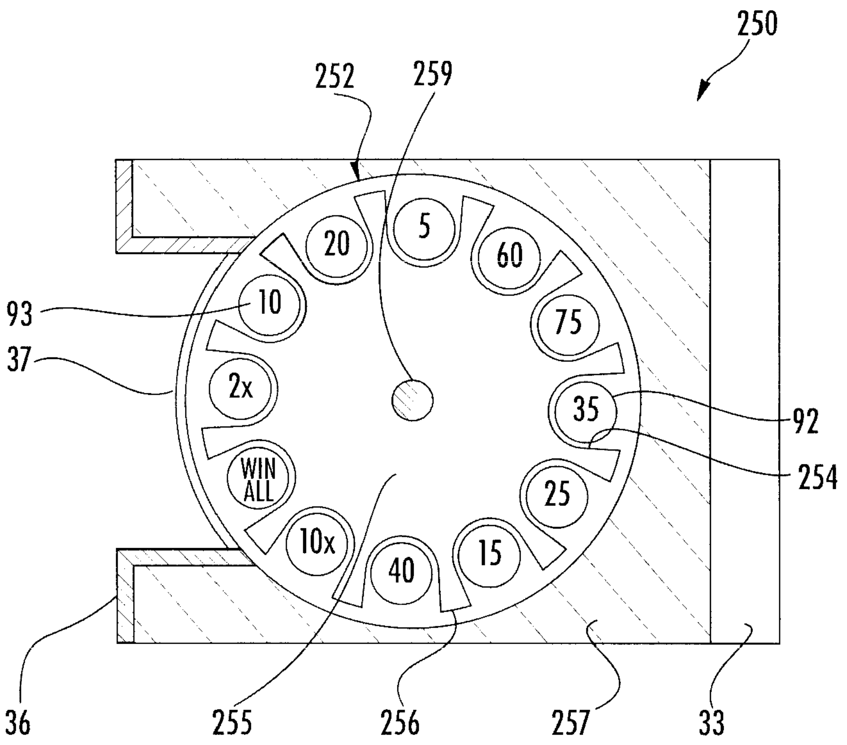
FIG. 4 is substantially a side cross sectional view of an alternative prize object holder of the present invention.

Turning now to FIG. 4, an alternative embodiment of a display device 250 is shown. Display device 250 comprises a cylindrical prize object holder 252 that may be rotated around its central axis 259. Axis 259 can be a metal shaft. Prize object holder 252 comprises a disc 255 with a plurality of chambers 254 positioned along the periphery of the holder, each chamber is adapted to hold a prize object 92. Disc 255 can be fabricated from a variety of materials such as metal, plastic or wood. Walls 256 separate adjacent chambers 254. A case 257 surrounds disc 255 and encloses chambers 254 except in front of window 37. Window 37 is transparent and allows players to view prize object 92 inside chamber 254. Prize objects 92 are free to move within chamber 254 and may come into contact with case 257 and window 37 as holder 252 rotates.

It is noted that case 257 retains prize objects 92 in chambers 254 during part of the rotation of holder 252 and window 37 retains prize objects 92 in chambers 254 during another portion of the rotation of holder 252.

As previously described, the rotation of prize object holder 252 can cause prize objects 92 to bounce and ricochet within chamber 254 and make a noise. Prize objects 92 have a prize symbol or indicia 93 mounted thereon.

One advantage of display device 250 is that transparent material is not needed to cover all of disc 255. Transparent material is only needed to cover window 37 in display device 250. In display device 50 the transparent material covers the entire circumference of prize object holder 52.

Alternative Display Embodiment

Figure 5:
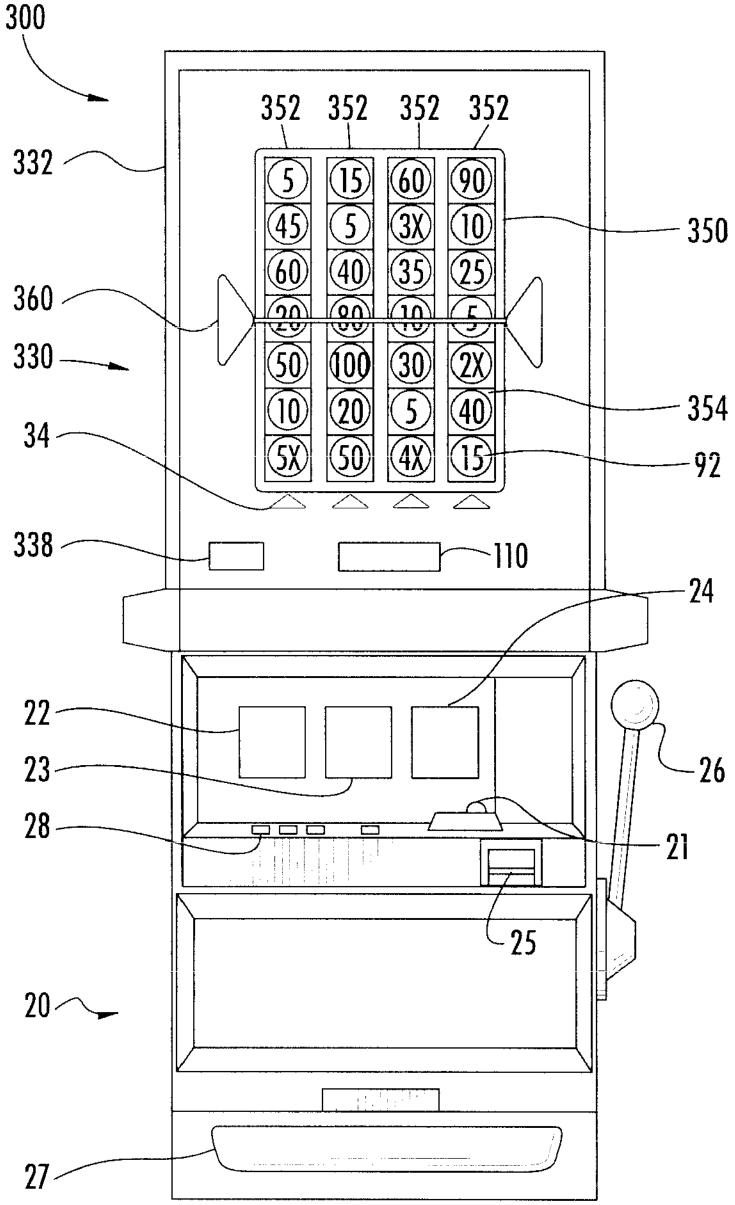
FIG. 5 is substantially a front view of an alternative embodiment of a gaming device of the present invention that utilizes a larger number of prize objects.
Figure 6:
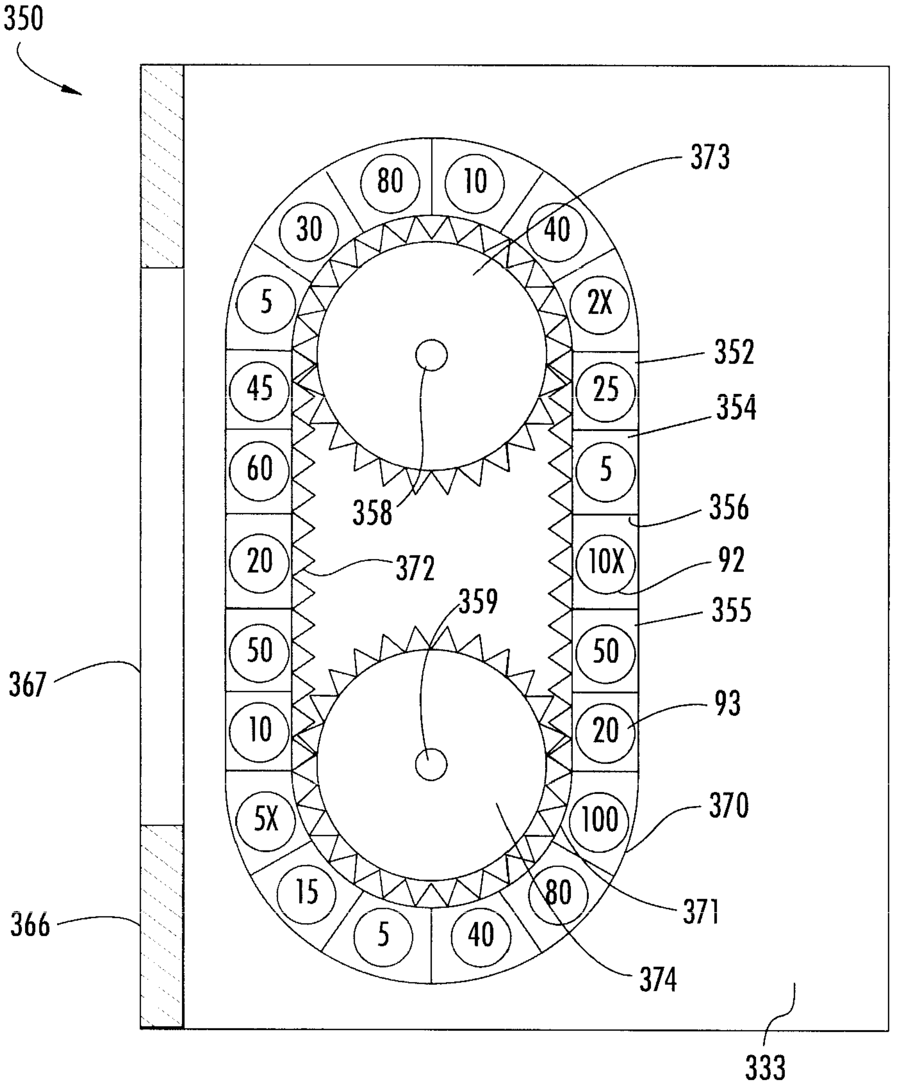
FIG. 6 is substantially a side cross sectional view of the prize object holder of FIG. 5.

Referring now to FIGS. 5 and 6, an alternative gaming device, generally indicated by reference number 300 is shown. Gaming device 300 comprises a primary game apparatus 20 and a bonus game apparatus 330. Bonus game 330 may comprise a display device 350. Game apparatus 20 was previously described with respect to FIG. 1.

Bonus game apparatus 330 has a housing 332 with an interior cavity 333. Housing 332 can be made from many different materials such as metal or plastic and can include decorative coverings or attachments and lights. Player input device 338 can be mounted in housing 332. Player input device 338 can be buttons or handles or rotary knobs. Player input device 338 can allow a game player to control some aspect of bonus game apparatus 330. A display 110 can be used to display prizes won on bonus game apparatus 330. Housing 320 can have a front surface 366 with a transparent window 367 located therein.

Display device 350 comprises several prize object holders 352 that are adapted to hold a plurality of prize objects 92. Prize objects 92 can have prize symbols 93 mounted thereon. FIG. 5 shows four prize object holders 352 mounted side by side. While four prize object holders 352 are shown, more or less prize object holders may be used in display device 350. Each prize object holder has seven prize objects displayed. More or less prize objects can be displayed. Holders 352 are shown rotating about a horizontal axis in FIG. 5. Prize object holders 352 can also rotate about a vertical axis. Prize object holder 352 is at least partially transparent allowing players to view prize objects 92 inside prize object holder 352. Prize object holder 352 can be made of a transparent material, such as plastic or glass. Display device 350 can have a payline 360.

As seen in FIG. 6, display device 350 comprises an oblong prize object holder 352 that may be rotated around a pair of axes 358 and 359. Axes 358 and 359 can comprise a metal shaft. Prize object holder 352 comprises a conveyor belt structure 355 with a plurality of chambers 354. Chambers 354 are separated by walls 356. Each chamber 354 is adapted to hold a prize object 92. Conveyor belt 355 has a transparent outer surface 370 and an inner surface 371. Inner surface 371 has several teeth 372 mounted thereon. Gears 373 and 374 engage teeth 372. When one or both of axes 358 and 359 are driven, conveyor belt 355 rotates. The rotation of conveyor belt 355 moves the prize objects 92 past a game player looking into window 367.

Conveyor belt 355 can be fabricated from a variety of materials such as metal, plastic or wood. Conveyor belt 355 preferably is made of injection molded rubber with a transparent acrylic outer surface 370.

Conveyor belt 355 can also be driven by means other than gears and teeth. For example, a driven roller could be mounted against inner surface 371 and turn conveyor belt 355 through frictional contact. Conveyor belt 355 could also have a series of slots that could be engaged by gears 373 and 374.

It is noted that prize objects 92 can be allowed to move within chambers 354. The rotation of prize object holder 352 can cause prize objects 92 to bounce and ricochet within chamber 354. Prize object holder 352 allows for a game player to view more prize objects in comparison to prize object holder 52 of FIG. 3. Prize object holder 352 allows a game player to view 7 prize objects at a time in each prize object holder. In comparison, prize object holder 52 displays 3 prize objects in each prize object holder.

It is noted that the game player can view the contents of several of the chambers 354 at the same time. The game player can simultaneously view a set or subset of the prize objects 92.

Game Play Flow Chart

Figure 7:
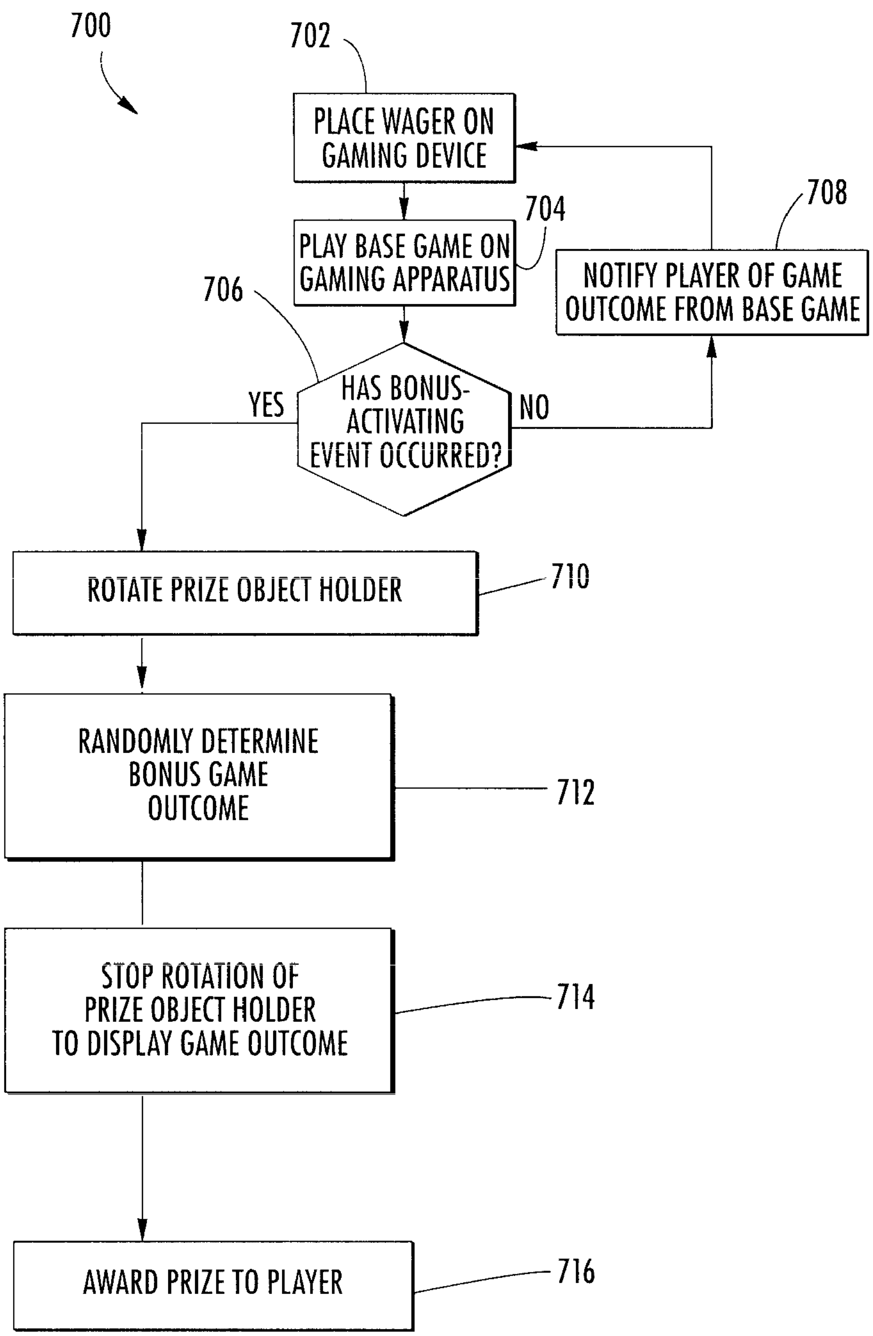
FIG. 7 is substantially a flowchart of a gaming method of the present invention.

Referring now to FIG. 7, a flowchart of a game play 700 is shown using game device 10 is shown. At step 702, a player preferably initiates game play 700 by placing a wager on gaming device 10. The wager may be in form of cash or credit from actual domestic or foreign currency, vouchers, coupons, tickets, electronic cards, and other sources or forms of wagers known in the art. Once the player initiates game play 700, the player may play a base game on the gaming apparatus at step 704. At step 706, the controller (not shown) detects the occurrence of a bonus-activating event. If the controller does not detect a bonus-activating event, then the controller notifies the player of the game outcome from the base game at step 708. The player may place a wager again and repeat steps 704 and 706 to continue playing a game on the base gaming apparatus.

If the controller detects a bonus-activating event, the controller causes the rotation of prize object holders 52 or 352 at step 710. Alternatively, the controller may wait until button 38 or 338 is depressed before rotating the prize object holders. The controller then randomly determines the outcome of the bonus game at step 712. Next, the controller stops the rotation of prize object holders 52 or 352 in order to display the game outcome as indicated by prize objects 92 at step 714. A winning game outcome may be an alignment of symbols that fills a row or column along payline 60 or 360. If a winning game outcome is displayed, then the player is awarded any prizes at step 716. The steps shown in the flowchart do not necessarily imply that the steps have to take place in a particular order. The order of steps may be varied; some steps may be eliminated; and, some steps may be replaced with other steps. Such variations still fall within the scope of the invention.

Alternative Game Play Flow Chart

Figure 8:
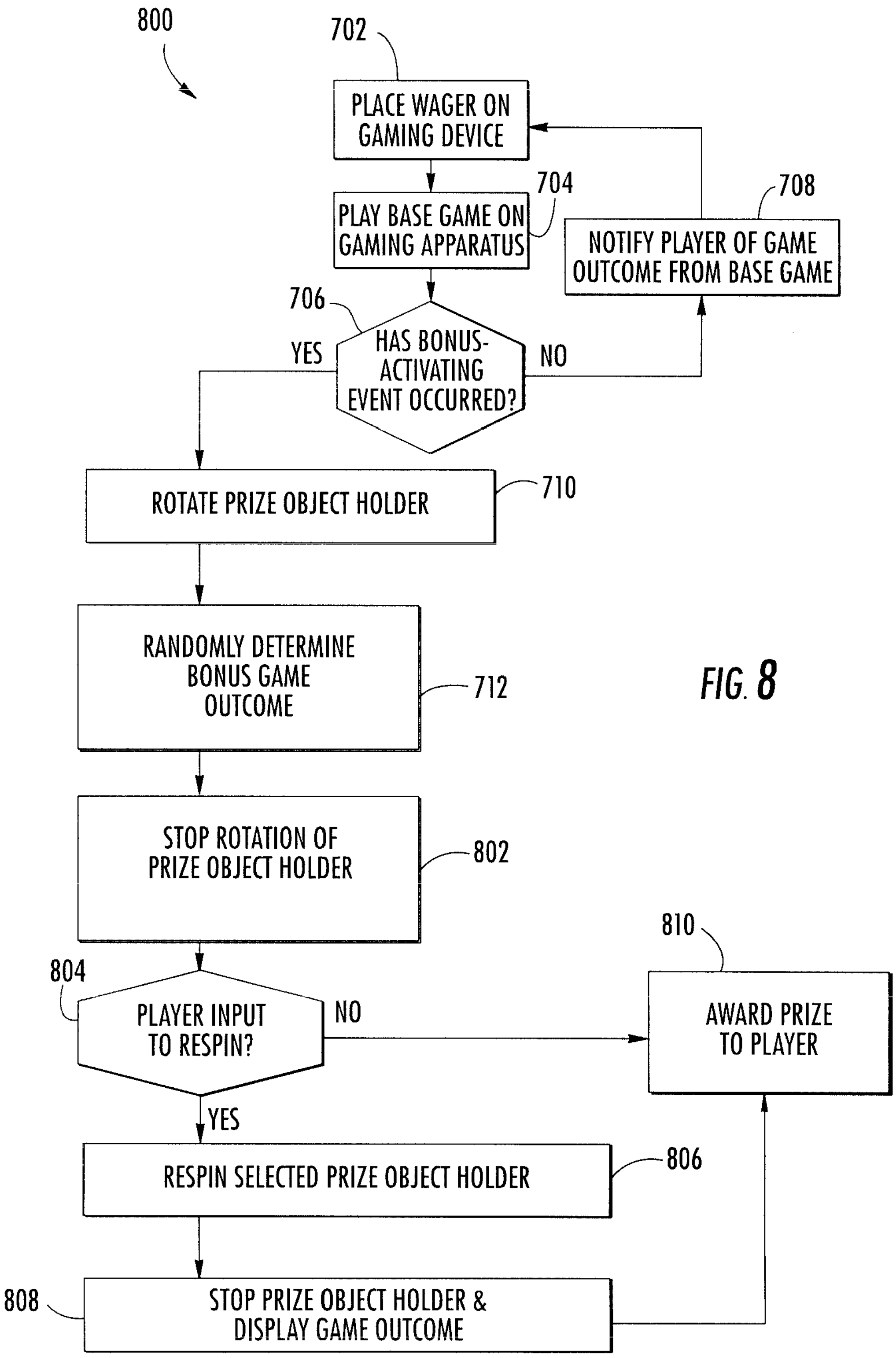
FIG. 8 is substantially an alternative flowchart of a gaming method of the present invention.

Referring now to FIG. 8, another flowchart of a game play 800 is shown using game device 10 is shown. At step 702, a player preferably initiates game play 700 by placing a wager on gaming device 10. The wager may be in form of cash or credit from actual domestic or foreign currency, vouchers, coupons, tickets, electronic cards, and other sources or forms of wagers known in the art. Once the player initiates game play 700, the player may play a base game on the gaming apparatus at step 704. At step 706, the controller (not shown) detects the occurrence of a bonus-activating event. If the controller does not detect a bonus-activating event, then the controller notifies the player of the game outcome from the base game at step 708. The player may place a wager again and repeat steps 704 and 706 to continue playing a game on the base gaming apparatus.

If the controller detects a bonus-activating event, the controller causes the rotation of prize object holders 52 or 352 at step 710. Alternatively, the controller may wait until button 38 or 338 is depressed before rotating the prize object holders. The controller then randomly determines the outcome of the bonus game at step 712. Next, the controller stops the rotation of prize object holders 52 or 352 in order to display the game outcome as indicated by prize objects 92 at step 802.

At step 804 the game player is allowed to decide if any, some or all prize object holders 352 are to be re-spun or rotated again. Buttons 34 are used to select which prize object holders 352 are to be re-spun. If the controller does not detect any prize object holders to be re-spun, then the controller may award any prizes at step 810.

If the controller detects one or more prize object holders to be re-spun, the controller causes the rotation of prize object holders 52 or 352 at step 806. Next, the controller stops the rotation of prize object holders 52 or 352 in order to display the game outcome as indicated by prize objects 92 at step 808.

It is noted that this configuration achieves the ability to maintain the randomness of game outcomes, while at the same time, provides the illusion to the player that the player can influence the outcome of the game.

A winning game outcome may be an alignment of symbols that fills a row or column along payline 60 or 360. If a winning game outcome is displayed, then the player is awarded any prizes at step 810. The steps shown in the flowchart do not necessarily imply that the steps have to take place in a particular order. The order of steps may be varied; some steps may be eliminated; and, some steps may be replaced with other steps.

For example, player input device 34 can be used to allow a game player to control when the prize object holders 52 or 352 begin to rotate or begin to stop rotating. Player input device 34 does not control the final position of the prize object holders. The final position may be chosen according to a predetermined game outcome.

In other embodiments, prize object holders 52 or 352 may be stopped at a particular position by the player using player input device 34.

It can thus be seen that the preferred embodiments can solve one or more problems associated with the prior art or provide advantages over prior art devices. One embodiment of the present invention provides a gaming device that utilizes a highly visible display device that may be used with a primary game or a bonus game. This embodiment can provide a display device that utilizes physical prize objects that can add excitement and more realism to the gaming experience provided by the gaming machine.

Display Holder Embodiment

Turning to FIGS. 9-12, an alternative gaming device, generally indicated by reference number 900 is shown. Gaming device 900 comprises a primary game apparatus 20 and a bonus game apparatus 930. Bonus game apparatus 930 may comprise a display device 950. Game apparatus 20 was previously described with respect to FIG. 1.

Bonus game apparatus 930 has a housing 932 with an interior cavity 933. Housing 932 can be made from many different materials such as metal or plastic and can include decorative coverings or attachments and lights. Player input device 938 can be mounted in housing 932. Player input device 938 can be buttons or handles or rotary knobs. Player input device 938 can allow a game player to control some aspect of bonus game apparatus 930. A display 110 can be used to display prizes won on bonus game apparatus 930. Housing 932 can have a front surface 960 with a transparent window 970 located therein.

Figure 9:
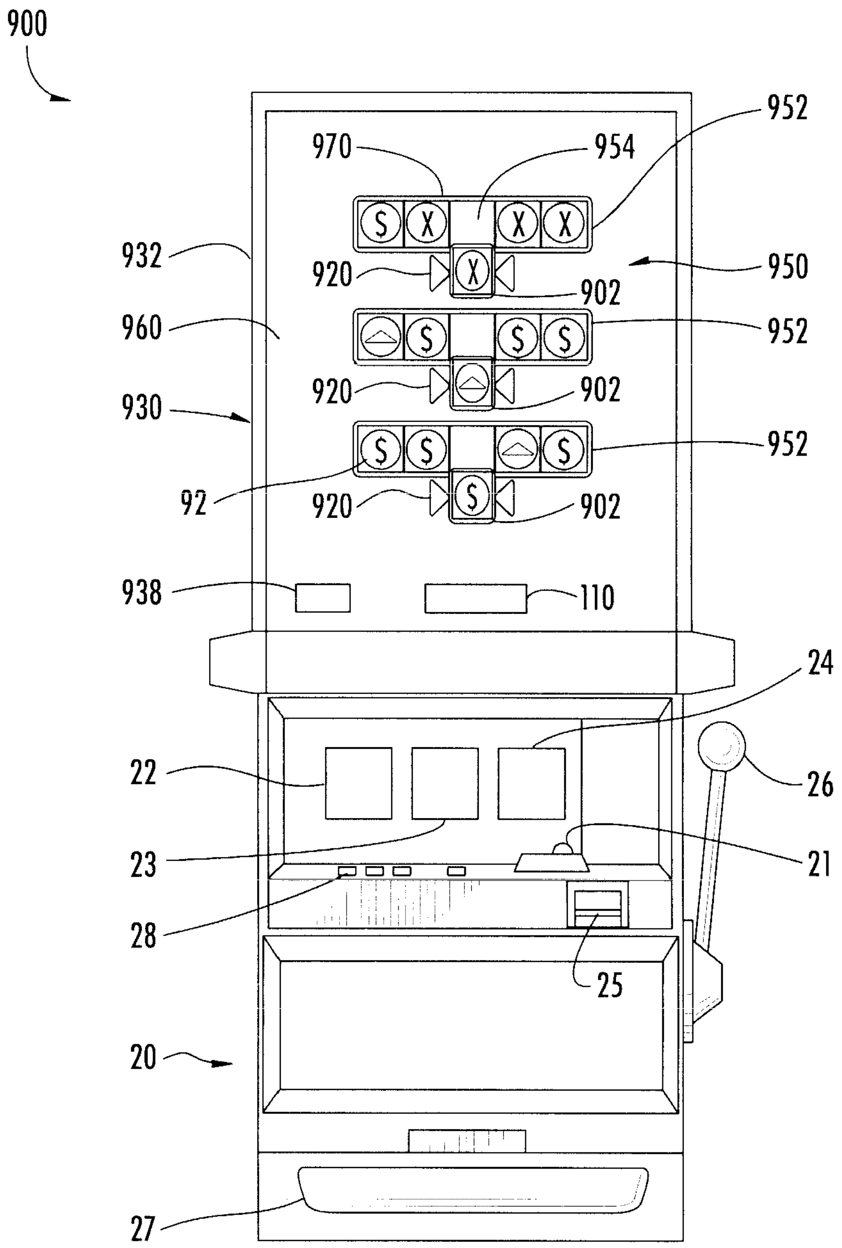
FIG. 9 is substantially a front view of an alternative embodiment of a gaming device of the present invention that utilizes a display holder.

Display device 950 comprises several prize object holders 952 that are adapted to hold a plurality of prize objects 92. Prize objects 92 can have prize symbols 93 mounted thereon. Prize object holder 952 has several chambers 954 separated by walls 956 that hold prize objects 92. FIG. 9 shows three prize object holders 952 mounted on top of each other. While three prize object holders 952 are shown, more or less prize object holders may be used in display device 950. Each prize object holder has five prize objects displayed. More or less prize objects can be displayed. Prize object holder 952 is similar to prize object holder 52 of FIG. 3 and can rotate about an axis.

Holders 952 are shown rotating about a vertical axis in FIG. 9. Prize object holders 952 can also rotate about a horizontal axis. Prize object holder 952 is at least partially transparent allowing players to view prize objects 92 inside prize object holder 952.

A display holder 902 can be located below each prize object holder 952. Display holder 902 is adapted to receive prize objects 92 from prize object holder 952 and to hold prize objects 92 for viewing by a game player. One or more indicators 920 can be arranged around display holder 920 in order to attract attention to display holder 902. Indicators 920 can be an object such as an arrow or payline and can be illuminated to attract attention. Prize objects 92 can also be illuminated within chamber 954 or within display holder 902.

A transport mechanism 929 is provided for removing prize object 92 stored in chamber 954, moving the prize object 92 to display holder 902, displaying the prize object 92 and moving the prize object 92 back to chamber 954.

Prize objects 92 are stored in prize object holder 952 in an individually controlled manner so that individual prize objects can be selectively removed from the holder. This allows particular prize objects with particular symbols or values to be individually manipulated and displayed when desired. This may be accomplished in different ways.

Figure 10:
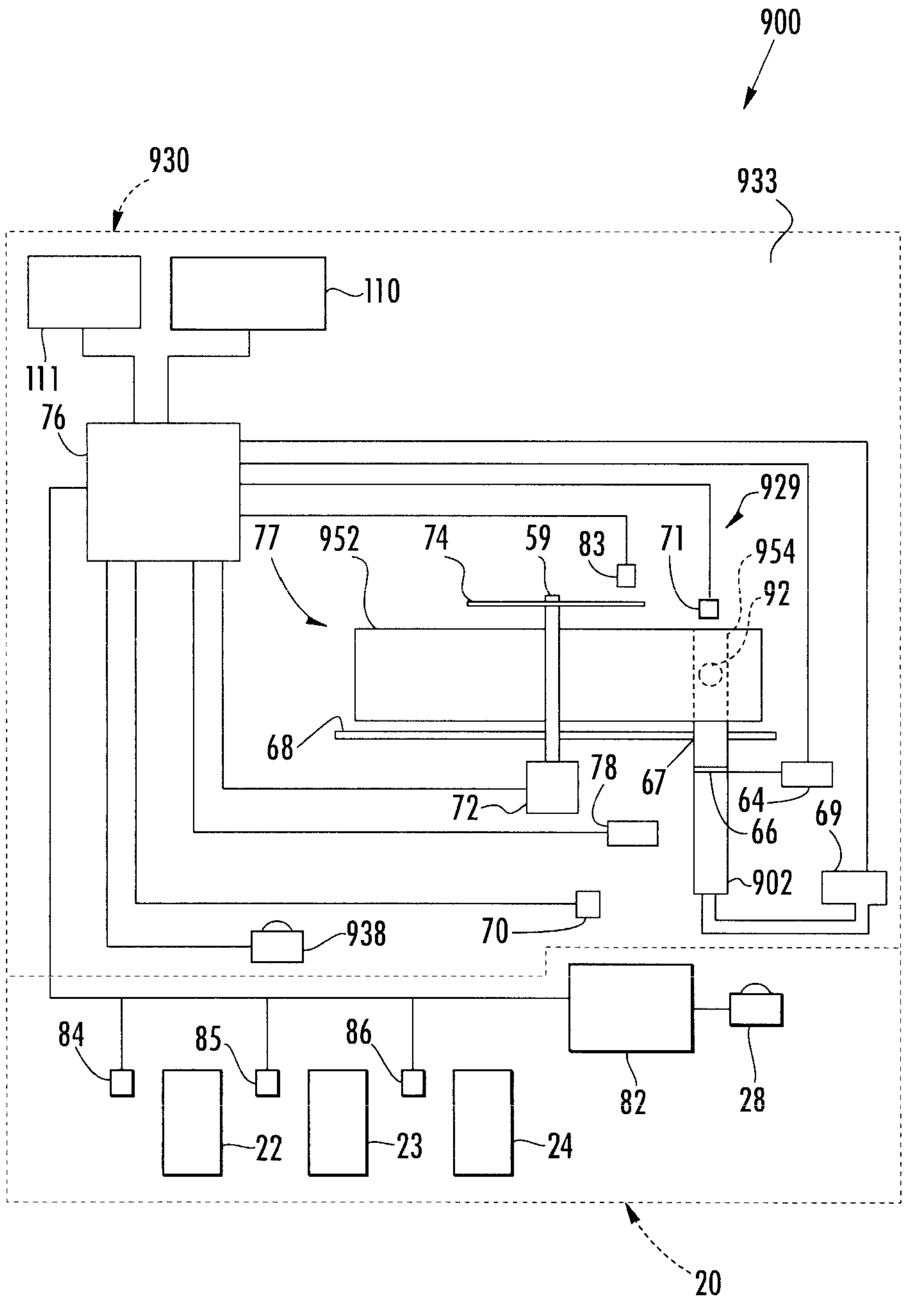
FIG. 10 is substantially a schematic diagram of the gaming device of FIG. 9.
Figure 11:
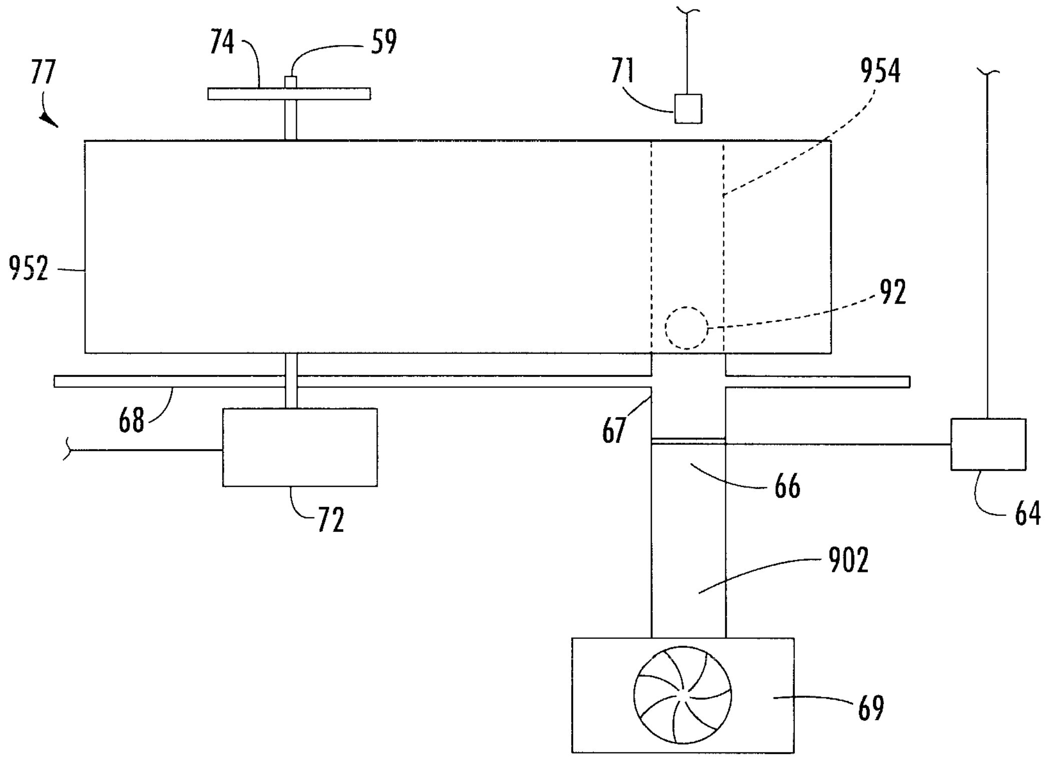
FIG. 11 is substantially an enlarged view of the prize object holder of FIG. 10.
Figure 12:
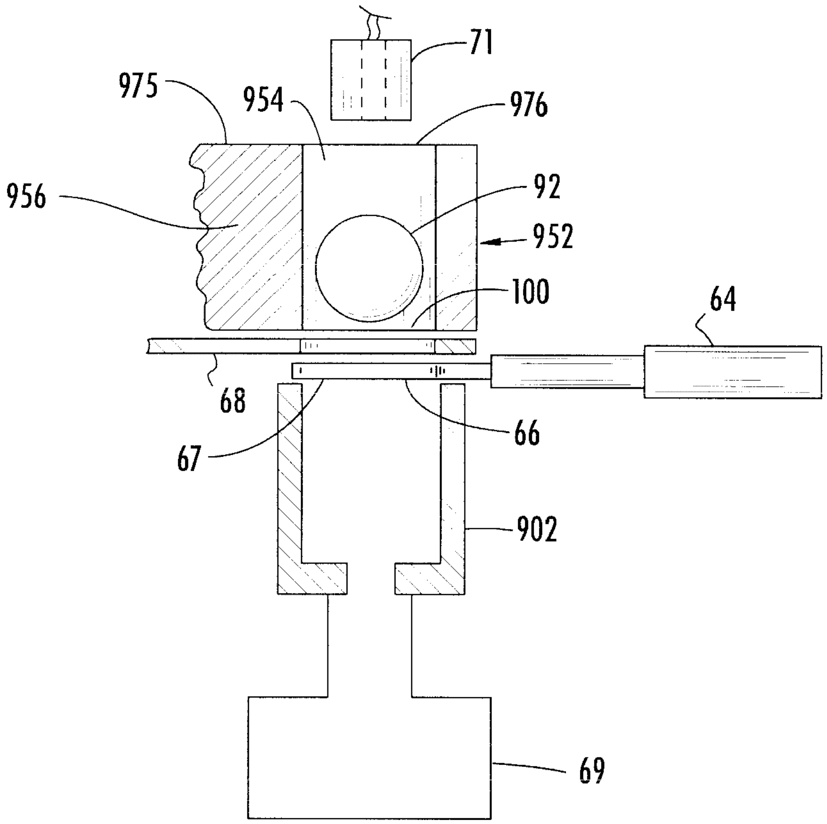
FIG. 12 is substantially an enlarged partial side view of the prize object holder of FIG. 10.

In the preferred embodiment, holder 952 is arranged to allow the force of gravity to remove prize objects 92 from the holder. Referring now to FIGS. 10-12, each chamber 954 has a lower opening 100 that is large enough for prize object 92 to pass through. A plate 68 is provided on the lower surface of holder 952 for preventing prize objects 92 from falling out of chambers 954. A hole 67 is provided in one portion of plate 68 for allowing prize object 92 to pass through the plate. A gate 66 blocks prize object 92 until it is opened by an actuator 64. Gate 66 may cover the entire hole 67 or just a portion of it and it may be operated in a sliding or hinged manner. Actuator 64 may be an electrical solenoid actuator.

After controller 76 has determined which prize object is to be displayed, the controller rotates holder 952 until the desired prize object 92 is positioned over the plate hole 67. At the appropriate time, controller 76 activates actuator 64 to open gate 66. The force of gravity then pulls prize object 92 downward through hole 67 into display holder 902. Display holder 902 may be a chamber with a transparent or partially transparent wall that allows the player to see selected prize object 92. In the preferred embodiment, display holder 902 comprises a tube that projects outward from the front surface of display device 950. This allows players to view prize object 92 from many different angles and view prize symbols 93. Sensors 70 and/or 71 may be used to verify that prize object 92 has fallen into display holder 902. If sensors 70 and/or 71 do not detect prize object 92 in its proper position, controller 76 may enter an error mode.

If the prize object 92 is detected in its proper position, controller 76 may cause display 110 to display the prize, if any, that the player has won. Other effects may also be presented, such as pre-recorded sound from speakers. If the actual prize is money, the amount of the prize may be added to the player's credit meter or the prize may be dispensed from dispenser 111 or coin dispenser 27.

After prize object 92 has been displayed long enough, controller 76 operates a fan 69 that can be connected with display holder 902. For example, fan 69 may be placed below display holder 902. When activated by controller 76, fan 69 operates and creates a stream of air that blows prize object 92 in display holder 902 back into chamber 954. Although many fans can be used, one suitable fan is DC brushless fan motor model number BG0703-B044-000 available from Minebea Co., Ltd. of Tokyo, Japan. Of course, other air sources besides fans may be used without departing from the scope of the present invention.

Sensors 70 and/or 71 may be used to verify that prize object 92 has returned to chamber 954. If the ball is not detected in its proper position, controller 76 may enter an error mode and an attendant is called. Sensor 71 can be placed next to the top wall 975 of holder 952 and a hole 976 is provided in wall 975 next to each chamber 954.

Components of the present invention may be arranged alternatively so that display holder 902 is located above prize object holder 952 and prize objects 92 are blown upwards into the display holder. The force of gravity would pull prize object 92 back into chamber 954

A power failure or power surge could cause actuator 64 to malfunction and improperly open gate 66 while prize display 950 is idle. This would cause prize object 92 to fall out of chamber 954 into display window 902, thereby giving a false indication that the player had won a prize. In order to prevent this, in the preferred embodiment, at least one chamber 954 does not have a prize object 92. This empty chamber is positioned over hole 67 whenever prize display 950 is idle.

Other methods for moving and displaying prize objects 92 may be used. The present invention is not limited to any particular method or apparatus for moving or displaying prize object 92.

Display 950 of the present invention may also comprise means for simultaneously displaying a plurality of prize objects 92. Plate 68 may have multiple holes 67 (not shown), each with its own gate 66 and actuator 64, for supplying prize objects to multiple display holders.

In yet another embodiment, several prize objects 92 may be located in each chamber 954. When gate 66 is opened, all of the prize objects 92 are allowed to fall into display holder 902. In this embodiment, display holder 902 is large enough to display all of the prize objects simultaneously. When the display period has ended, all of the prize objects 92 are blown back into chambers 954 and gates 66 are closed to contain the prize objects.

With multiple prize objects being displayed, it is possible to use combinations of prize objects to indicate various bonus outcomes. It is also possible to replace the primary display of a gaming device with display device 950. In other words, game apparatus 20 may be entirely replaced with display device 950.

A single display device 950 may also be used with a plurality of game apparatus 20. In this embodiment, each game apparatus is in communication with display device 950 by a communication device (not shown) such as a network cable, an Ethernet cable, and appropriate hardware, such as network interface cards, may be included in display device 950 and game apparatus 20. When one of the game apparatus 20 produces a bonus-activating event, a signal is sent to display device 950 starting the bonus sequence.

Alternative Game Play Flow Chart

Figure 13:
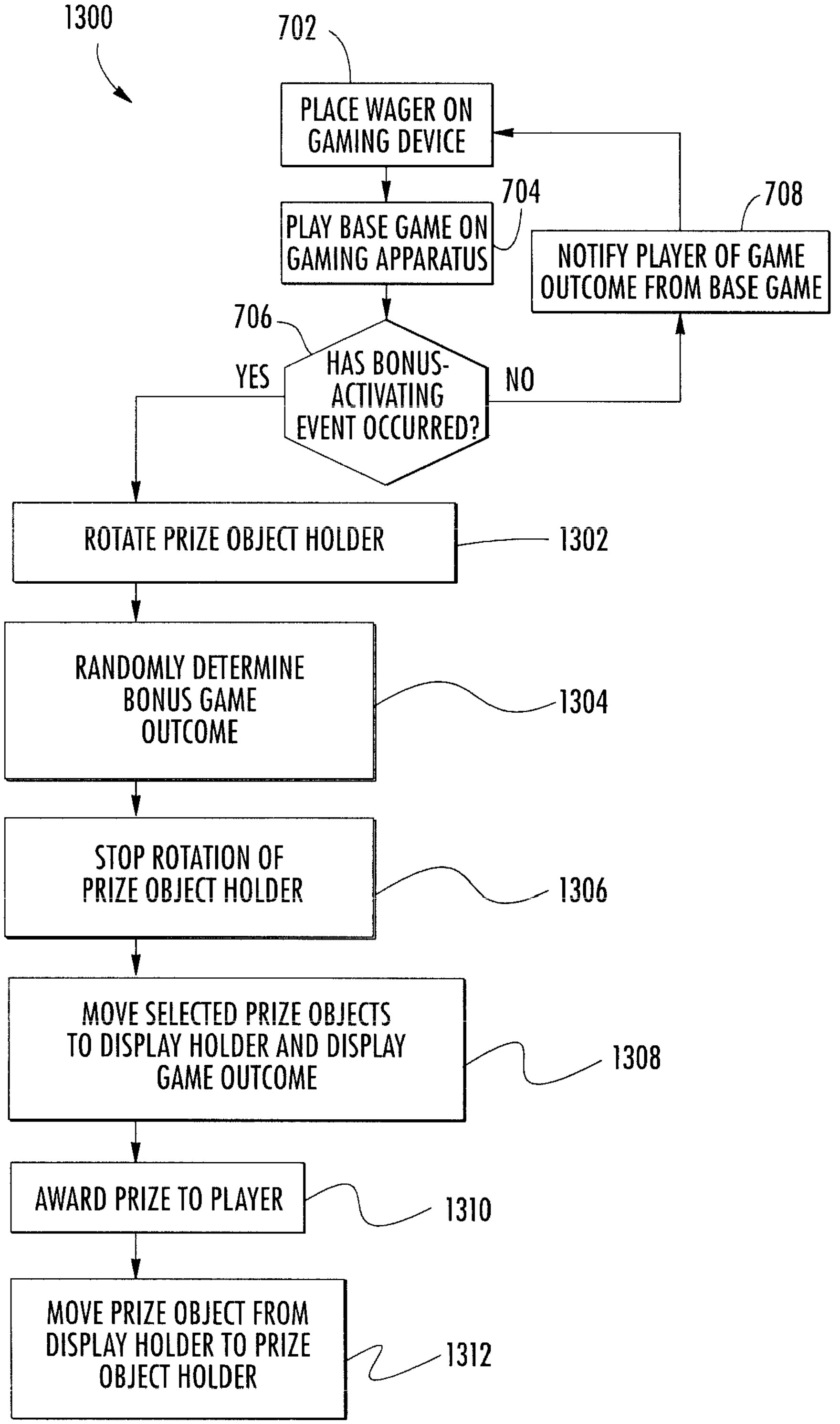
FIG. 13 is substantially a flowchart of a gaming method of the present invention.

Referring now to FIG. 13, a flowchart of a game play 1300 using gaming device 900 is shown. At step 702, a player preferably initiates game play 1300 by placing a wager on the gaming device. The wager may be in form of cash or credit from actual domestic or foreign currency, vouchers, coupons, tickets, electronic cards, and other sources or forms of wagers known in the art. Once the player initiates game play 1300, the player may play a base game on the gaming apparatus at step 704. At step 706, the controller (not shown) detects the occurrence of a bonus-activating event. If the controller does not detect a bonus-activating event, then the controller notifies the player of the game outcome from the base game at step 708. The player may place a wager again and repeat steps 704 and 706 to continue playing a game on the gaming apparatus.

If the controller detects a bonus-activating event, the controller starts rotation of prize object holders 952 at step 1302. Alternatively, the controller may wait until button 938 is depressed before rotating the prize object holders. The controller then randomly determines the outcome of the bonus game at step 1304. Next, the controller stops the rotation of prize object holders 952 at step 1306.

At step 1308, prize objects 92 are moved from selected chamber 954 to display holder 902 in order to display the game outcome. At this point, lights 920 may illuminate or flash to attract player attention. A winning arrangement of symbols may be three of the same symbols 93 on prize objects 92 that are displayed in display holder 902.

The controller may award any prizes to the game player at step 1310. The prize objects 92 are moved from display holder 902 back to chamber 954 in holder 952 in order to reset display device 950 for the next game at step 1312.

The steps shown in the flowchart do not necessarily imply that the steps have to take place in a particular order. The order of steps may be varied; some steps may be eliminated; and, some steps may be replaced with other steps. Such variations still fall within the scope of the invention.

Although the description above contains many specifications, these should not be construed as limiting the scope of the invention but as merely providing illustrations of some of the presently preferred embodiments of this invention. This specification above, for instance, makes reference to bonus prizes. However, the present invention is not thereby intended to be limited to providing bonus prizes. Rather it is intended that the present invention can, in certain embodiments, be used independently as a stand-alone game without necessarily including bonusing. Thus, the scope of the invention should be determined by the claims as issued and their legal equivalents rather than by the preferred examples given.

Multi-Apparatus Gaming System Schematic

Figure 14:
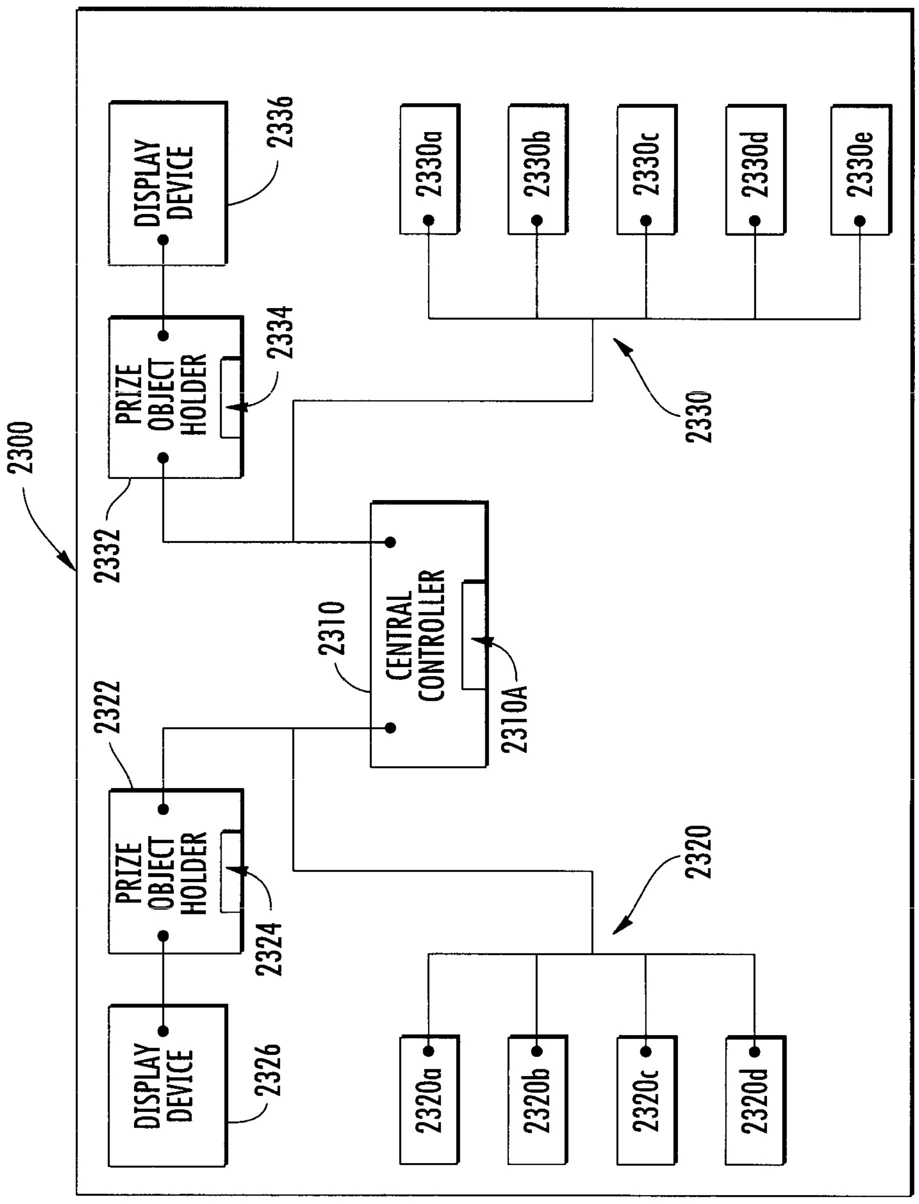
FIG. 14 is substantially a schematic diagram of a multi-apparatus gaming system of the present invention.

Another embodiment of the present invention involves a multi-apparatus gaming system, such as that shown in the schematic outline of FIG. 14. For example, a multi-apparatus gaming system 2300 of the present invention may include a central controller 2310 which is configured to control gaming system 2300 by utilizing a random number generator 2310A to produce random or pseudo random numbers for a game cycle (alternatively, a bonus game cycle) for each gaming apparatus (such as 20 from FIGS. 1, 5 and 9) in one or more of the game apparatus arrays 2320 and 2330; each game apparatus array may include a plurality of game apparatus, such as 2320*a*, 2320*b*, 2320*c* and 2320*d* (2330*a*, 2330*b*, 2330*c*, 2330*d* and 2330*e*), for example. Two game apparatus arrays are shown in FIG. 14; however, it is understood that a plurality of game apparatus arrays may be included in gaming systems of the present invention. Each game apparatus in the game apparatus arrays 2320 and 2330 may have its own display device, not shown here (such as 50 from FIGS. 1-3, 250 from FIG. 4, 350 from FIGS. 5-6, and 950 from FIG. 9), and prize object holder, not shown here (such as 52 from FIGS. 1-3, 252 from FIG. 4, 352 from FIGS. 5-6, and 952 from FIGS. 9-10).

In one embodiment involving a special community bonus cycle, the central controller 2310 may be configured to determine a random bonus game outcome, subsequently select a prize object from an array (community) prize object holder 2322 (2332) and cause the selected prize object to be displayed in an array (community) display device 2326 (2336) in order to communicate the random bonus game outcome to the player from among a group of players playing in a particular game apparatus array. The outcome of the special community bonus game may be determined similarly to that previously presented in the discussion of FIGS. 1 and 3, for example.

In further reference to FIG. 14, central controller 2310 may be one or more computers, processors or similar devices and may be configured to operate similarly to controllers 76 and 82 described in FIGS. 2 and 10. For example, in one embodiment, bonus game play may include allowing the player the appearance of controlling pre-selection of the prize object via an input device. Central controller 2310 may also transmit and/or detect a variety of other information, such as when coins (not shown) or currency (not shown) have been inserted into a wage acceptor (such as elements 21 or 25 in FIGS. 1 and 5), when a game starts, when an error has occurred or when a sensor detects tampering.

Additional Game Play Flow Chart

Figure 15:
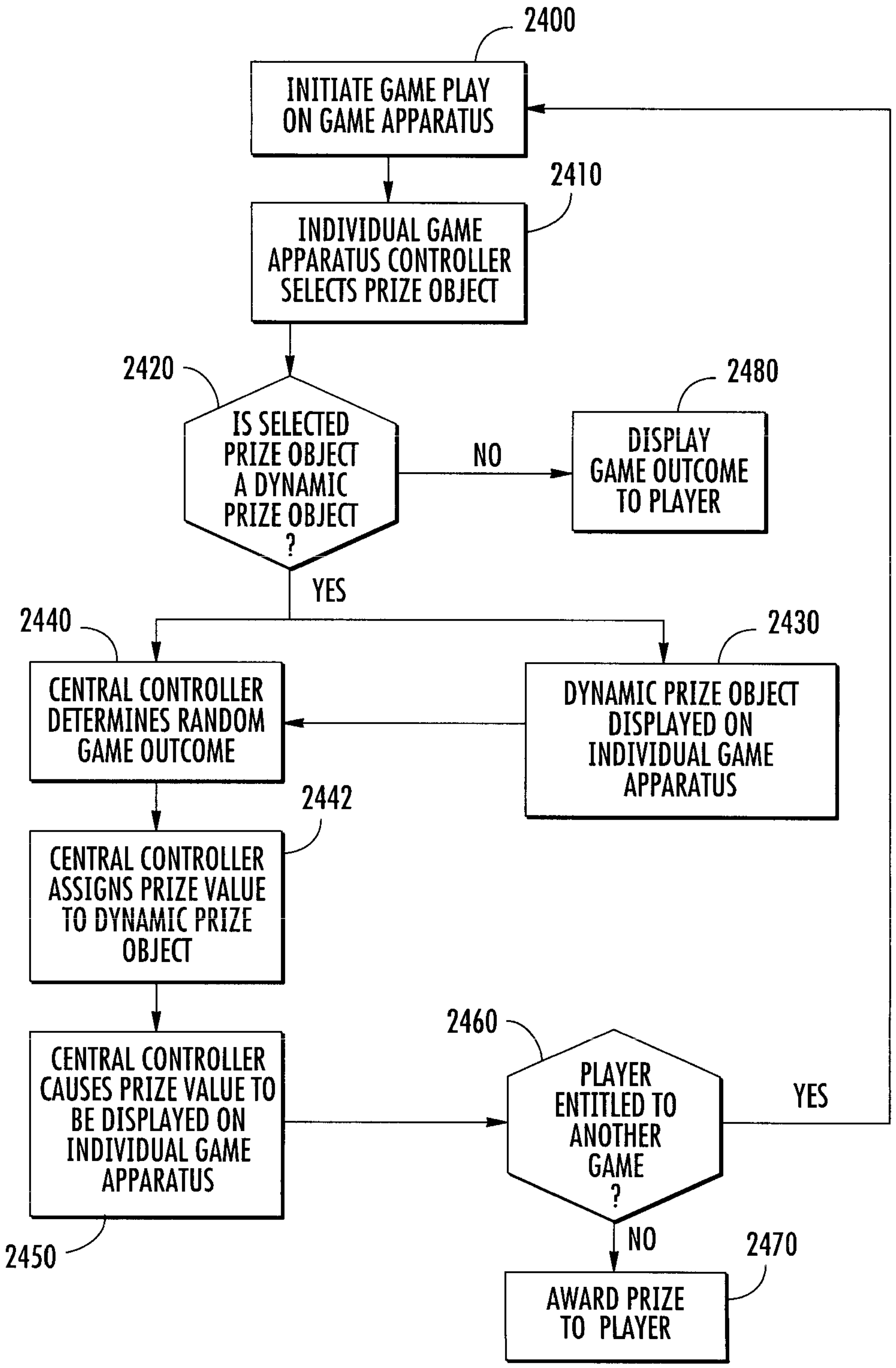
FIG. 15 is substantially a flowchart of an alternative gaming method of the present invention.

In a further embodiment of the present invention, a flowchart of game play involving a dynamic prize object is shown in FIG. 15. At step 2400, a player typically initiates primary game play by placing a wager (for example, see steps 702 from FIGS. 7, 8 and 13) on a gaming apparatus (such as one of the array of game apparatus in FIG. 14). After the player initiates primary game play on a game apparatus, the controller for the individual game apparatus determines a first random game outcome and selects a prize object from the prize object holder of the individual game apparatus at step 2410. The individual game apparatus controller is in communication with the central controller. At step 2420, the game apparatus controller determines if the selected prize object is a “dynamic” prize object. A dynamic prize object is a prize object (typically a ball) which is generic or changeable in aspect or appearance and it typically bears proxy (substitute) symbols or indicia rather than a specific number, multiplier or prize amount associated with the prize objects previously described. In itself, the dynamic prize object is distinguishable from all other prize objects and does not directly indicate or display a specific prize or prize amount. If the selected prize object from step 2410 is not a dynamic prize object, the first random game outcome corresponding to the selected prize object is displayed to the player at step 2480.

If the selected prize object from step 2410 is a dynamic prize object, the dynamic prize object is displayed to the player in a display device of the individual game apparatus at step 2430. The central controller determines a second random game outcome at step 2440 and assigns a prize value (at step 2442) to the dynamic prize object displayed on the individual game apparatus. The associated prize value of the dynamic prize object (such as monetary awards, goods, services, credits, progressive prize, a chance to play another game, for example) is then displayed to the player on the individual game apparatus at step 2450.

At step 2460, the controller (game apparatus or central) determines if the player may be entitled to play another game; if yes, then the game play proceeds back to step 2400. If no additional game play is indicated at step 2460, the prize corresponding to the associated prize value determined in steps 2440-2450 is awarded to the player at step 2470.

Although the game play described above for the flowchart of FIG. 15 has been presented in the context of primary game play, it is understood that the described game play may apply equally to bonus game play. For example, at step 2460, if the central controller determines that the player is entitled to play another game, then the subsequent game play make take the form of (a) steps 2400-2470 in FIG. 15, representing bonus game play or (b) steps 702-808 and 702-1312 as outlined in FIGS. 8 and 13, respectively, for example.

Accordingly, the present invention provides a gaming device that may provide exciting and attractive game displays to game players and may provide a number of game play possibilities for game designers.

Although the description above contains many specifications, these should not be construed as limiting the scope of the invention but as merely providing illustrations of some of presently preferred embodiments of this invention. Thus, the scope of the invention should be determined by the appended claims and their legal equivalents rather than by the examples given.

We claim:

1. A gaming device comprising:
(A) a housing;
(B) a plurality of moveable prize objects, the prize objects being configured to communicate a game outcome;
(C) at least one moveable prize object holder mounted in the housing, the prize object holder having a plurality of chambers, each chamber configured to non-rigidly contain at least one of the plurality of prize objects, wherein the chambers allow the prize objects to move within the chambers and each chamber has a viewable portion, wherein a player may see the at least one prize object within the chamber; and
(D) wherein the housing and the prize object holder are configured to allow a player to view the chambers and more than one prize object at a time within the chambers.

2. The gaming device of claim 1 wherein the game player can view at least two of the prize objects in at least two of the chambers.

3. The gaming device of claim 1, wherein the prize object holder further comprises: a disc having the chambers arranged around an outer periphery of the disc, each of the chambers being separated by a wall.

4. The gaming device of claim 1 further comprising a display holder, the display holder being adapted to receive at least one prize object from the prize object holder and to display the prize object to the player.

5. The gaming device of claim 4, wherein a transporter mechanism is communicated with the display holder and the prize object holder, the transporter mechanism being adapted to move the prize object between the prize object holder and the display holder.

6. The device of claim 1 wherein each chamber of the moveable prize object holder is configured to allow the prize objects contained therein to bounce and ricochet within the chambers.

7. The device of claim 6 wherein each chamber is further configured to allow moving the prize objects to provide noise to attract and entertain players.

8. A gaming method comprising, but not necessarily in the order shown:
(A) allowing a player to place a wager and play a game of chance;
(B) determining a first game outcome, the first game outcome comprising a prize qualifying event; and
(C) if the first game outcome comprises the prize qualifying event:
(a) activating a display comprising a plurality of prize objects contained in a plurality of prize object holders, the prize object holder having a plurality of chambers that non-rigidly contain the prize objects, the prize objects being viewable within the chamber, a subset of the prize objects being simultaneously viewable by the player;
(b) moving the prize object holder such that the prize objects are allowed to move within the chambers during movement of the prize object holder;
(c) stopping the prize object holder, the stopped prize objects conveying a second game outcome; and
(d) awarding a prize to the player.

9. The method of claim 8, further comprising allowing a player to provide input to cause movement of the prize object holder.

10. The method of claim 8, further comprising moving the prize object from the prize object holder to a display holder.

11. The method of claim 8, further comprising moving the prize object from the display holder to the prize object holder.

12. The method of claim 8 wherein moving the prize object holder further comprises allowing the prize objects contained therein to bounce and ricochet within the chambers.

13. The method of claim 12 further comprising providing noise by moving the prize objects to attract and entertain players.

14. A gaming device comprising:
(A) gaming means for allowing a player to play a game;
(B) at least one moveable prize object means for at least partially conveying a game outcome;
(C) at least one moveable prize object holder means for holding the moveable prize object means, the moveable prize object holder means having a plurality of chambers for non-rigidly containing at least one of the prize object means, the chambers allowing the prize object means to move within the chambers;
(D) view means for allowing a player to view a set of the prize object means within the chamber;
(E) actuator means for moving the moveable prize object holder means; and
(F) controller means for determining the game outcome and activating the actuator means according to the game outcome.

15. The gaming device of claim 14 further comprising:
(A) at least one display holder means for presenting the prize object means to the player; and
(B) transport means for moving the prize object means between the prize object holder means and the display holder means.

16. The gaming device of claim 14 wherein the moveable prize object holder means further comprises:
(A) a disc having an outer peripheral surface, the chambers arranged about the outer peripheral surface of the disc; and
(B) a plurality of walls separating the chambers.

17. The gaming device of claim 16 wherein the outer peripheral surface of the disc is covered with a transparent material such that the prize object means is visible within the chamber.

18. The gaming device of claim 16 wherein the disc is mounted in a case and the chambers are open.

19. The gaming device of claim 14 wherein the moveable prize object holder means further comprises:
(A) a conveyor belt having an outer peripheral surface, the chambers arranged about the outer peripheral surface; and
(B) a plurality of walls separating the chambers.

20. A gaming device comprising:
(A) a housing;
(B) a plurality of prize object holders mounted in the housing;
(C) the prize object holders having a plurality of chambers;
(D) at least one prize object positioned within each of the chambers, the prize object being moveable within the chamber, the chamber non-rigidly containing the prize object while at the same time allowing the prize object to move;
(E) a window located in each chamber, the window allowing the prize object within the chamber to be visible to a game player;
(F) a set of at least two of the chambers being visible to the game player;

(G) an actuator connected to the prize object holder, the actuator adapted to move and to stop the prize object holder; and (H) a controller in communication with the actuator, the controller being adapted to control the actuator such that the prize object indicates a game outcome.

21. The gaming device of claim 20, further comprising at least one display holder, the display holder being adapted to receive the prize object from the prize object holder and to display the prize object.

22. The gaming device of claim 21, wherein a transporter mechanism is communicated with the display holder and the prize object holder, the transporter mechanism being adapted to move the prize object between the prize object holder and the display holder.

23. The gaming device of claim 20 wherein the prize object holder is a disc having the chambers arranged around an outer periphery of the disc, each of the chambers being separated by a wall.

24. The gaming device of claim 20 wherein the prize object holder is a conveyor belt having an outer peripheral surface, the chambers arranged about the outer peripheral surface, each of the chambers being separated by a wall.

* * * * *